(12) United States Patent
Galli et al.

(10) Patent No.: US 8,482,402 B2
(45) Date of Patent: Jul. 9, 2013

(54) MASTER COMMUNICATION DEVICE IN A POWER LINE COMMUNICATION SYSTEM AND SLAVE COMMUNICATION DEVICE IN A POWER LINE COMMUNICATION SYSTEM

(75) Inventors: Stefano Galli, San Jose, CA (US); Akio Kurobe, Osaka (JP); Masato Ohura, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/431,807

(22) Filed: Mar. 27, 2012

(65) Prior Publication Data

US 2012/0183084 A1 Jul. 19, 2012

Related U.S. Application Data

(63) Continuation of application No. 12/347,755, filed on Dec. 31, 2008, now Pat. No. 8,188,853.

(60) Provisional application No. 61/019,052, filed on Jan. 4, 2008, provisional application No. 61/022,251, filed on Jan. 18, 2008.

(51) Int. Cl.
*G08B 1/08* (2006.01)

(52) U.S. Cl.
USPC .......... 340/539.1; 340/539.13; 340/5.61; 340/5.74; 340/12.32; 340/12.37; 370/331; 370/343; 370/345; 370/348; 370/442

(58) Field of Classification Search
USPC .......... 340/538, 539.1, 539.13, 5.61, 5.74, 340/12.32, 12.37; 370/331, 343, 345, 348, 370/442
See application file for complete search history.

(56) References Cited

U.S. PATENT DOCUMENTS

| | | | |
|---|---|---|---|
| 6,144,292 A | 11/2000 | Brown | |
| 6,329,905 B1 * | 12/2001 | Cunningham | 375/273 |
| 6,888,819 B1 | 5/2005 | Mushkin | |
| 6,888,844 B2 | 5/2005 | Mallory | |
| 6,961,325 B1 | 11/2005 | Avidor | |
| 7,173,935 B2 | 2/2007 | Lou | |
| 7,245,625 B2 | 7/2007 | Manis | |
| 7,305,009 B2 | 12/2007 | Gaskill | |
| 7,570,656 B2 | 8/2009 | Raphaeli | |

(Continued)

FOREIGN PATENT DOCUMENTS

| | | |
|---|---|---|
| CN | 100512080 | 7/2009 |
| EP | 2 023 501 | 2/2009 |
| WO | 03/013019 | 2/2003 |

OTHER PUBLICATIONS

International Search Report dated Oct. 5, 2009.

(Continued)

*Primary Examiner* — Tai T Nguyen
(74) *Attorney, Agent, or Firm* — Dickinson Wright PLLC

(57) ABSTRACT

A communication system includes communication protocols that allow a single network or multiple neighboring networks to increase resource sharing and reduce mutual interference and increase their overall throughput. Various protocols apply to homogenous networks in which all power line communication (PLC) devices of multiple networks are interoperable with respect to full power line communication in a common PHY and to heterogeneous networks having non-interoperable PLC networks which do not employ a common PHY. As to heterogeneous networks, a protocol herein enables coexistence via a special signaling scheme. In homogeneous networks, all nodes can communicate with each other using a common PHY, so that information about one PLC network can be transferred to another PLC network. In heterogeneous networks, not all PLC networks can exchange information using their own native PHY.

9 Claims, 42 Drawing Sheets

U.S. PATENT DOCUMENTS

| | | |
|---|---|---|
| 7,636,370 B2 | 12/2009 | Yonge |
| 7,664,117 B2 | 2/2010 | Lou |
| 7,889,061 B2 * | 2/2011 | Endo .......................... 340/12.33 |
| 2003/0123425 A1 | 7/2003 | Walton |
| 2005/0190741 A1 | 9/2005 | Pettersson |
| 2006/0198387 A1 | 9/2006 | Yonge |
| 2007/0047503 A1 | 3/2007 | Gonorovsky |
| 2007/0086408 A1 | 4/2007 | Kuroda |
| 2007/0097960 A1 | 5/2007 | Kurobe |
| 2007/0230377 A1 | 10/2007 | Nosaka |
| 2007/0230498 A1 | 10/2007 | Fujiwara |

OTHER PUBLICATIONS

Qingwen Liu, et al. "Cross-layer modeling of adaptive wireless links fo QoS support in heterogeneous wired-wireless networks," XP-001501634, Wireless Networks, ACM, New York, NY, Jan. 2006, vol. 12, No. 4, pp. 427-437.

PCT International Search Report dated May 14, 2009.

Chinese Office Action and Search Report dated Sep. 25, 2012, with English translation.

* cited by examiner

FIG. 12A

| MTA | 1 | 2 | 3 | 4 | 5 | 6 |
|-----|---|---|---|---|---|---|
| M   | 0 | 0 | 0 | 0 | 0 | 0 |
| x   | 0 | 0 | 0 | 0 | 0 | 0 |
| y   | 0 | 0 | 0 | 0 | 0 | 0 |
| z   | 0 | 0 | 0 | 0 | 0 | 0 |

FIG. 12B

| MTA | 1 | 2 | 3 | 4 | 5 | 6 |
|-----|---|---|---|---|---|---|
| M   | 0 | 0 | 0 | 0 | 0 | 0 |
| x   | 0 | 0 | 0 | 0 | 0 | 0 |
| y   | 1 | 1 | 0 | 0 | 0 | 0 |
| z   | 1 | 1 | 0 | 0 | 0 | 0 |

FIG. 12C

| MTA | 1 | 2 | 3 | 4 | 5 | 6 |
|-----|---|---|---|---|---|---|
| M   | T | T | 0 | 0 | 0 | 0 |
| x   | 0 | 0 | 0 | 0 | 0 | 0 |
| y   | 1 | 1 | 0 | 0 | 0 | 0 |
| z   | 1 | 1 | 0 | 0 | 0 | 0 |

FIG. 12D

| MTA | 1 | 2 | 3 | 4 | 5 | 6 |
|-----|---|---|---|---|---|---|
| M   | 1 | 1 | 0 | 0 | 0 | 0 |
| x   | 0 | 0 | 0 | 0 | 0 | 0 |
| y   | 1 | 1 | 1 | 0 | 0 | 0 |
| z   | 1 | 1 | 1 | 0 | 0 | 0 |

FIG. 13A

| MTA | 1 | 2 | 3 | 4 |
|-----|---|---|---|---|
| M1  |   |   |   |   |
| x   | 1 | 0 | 0 | 0 |
| y   | 1 | 0 | 0 | 0 |
| z   | R | 0 | 0 | 0 |
| w   | 1 | 0 | 0 | 0 |
| M2  | T | 0 | 0 | 0 |
| a   | 0 | 0 | 0 | 0 |
| b   | 0 | 0 | 0 | 0 |
| c   | T | 0 | 0 | 0 |
| d   | 0 | 0 | 0 | 0 | x → z link

FIG. 13B

| MTA | 1 | 2 | 3 | 4 |
|-----|---|---|---|---|
| M1  |   |   |   |   |
| x   | 0 | 0 | 0 | 0 |
| y   | 0 | 0 | 0 | 0 |
| z   | 0 | 0 | 0 | 0 |
| w   | 0 | 0 | 0 | 0 |
| M2  |   |   |   |   |
| a   | 1 | 0 | 0 | 0 |
| b   | 1 | 0 | 0 | 0 |
| c   | T | 0 | 0 | 0 |
| d   | R | 0 | 0 | 0 | a → b link

FIG. 14A

End of Step 3

| MTA | 1 | 2 | 3 | 4 |
|-----|---|---|---|---|
| M1  |   |   |   |   |
| x   | 1 | 1 | 0 | 0 |
| y   | 0 | 0 | 0 | 0 |
| z   | 1 | 1 | 0 | 0 |
| w   | 0 | 0 | 0 | 0 |
| M2  |   |   |   |   |
| a   | 0 | 0 | 0 | 0 |
| b   | 0 | 0 | 0 | 0 |
| c   | 0 | 0 | 0 | 0 |
| d   | 0 | 0 | 0 | 0 |

FIG. 14B

End of Step 4

| MTA | 1 | 2 | 3 | 4 |
|-----|---|---|---|---|
| M1  |   |   |   |   |
| x   | 1 | 1 | 0 | 0 |
| y   | $R$ | $R$ | 0 | 0 |
| z   | 1 | 1 | 0 | 0 |
| w   | $T$ | $I$ | 0 | 0 |
| M2  |   |   |   |   |
| a   | 0 | 0 | 0 | 0 |
| b   | 0 | 0 | 0 | 0 |
| c   | $T$ | $T$ | 0 | 0 |
| d   | 0 | 0 | 0 | 0 |

FIG. 15A

After Step 3

| MTA | 1 | 2 | 3 | 4 |
|---|---|---|---|---|
| M1 | | | | |
| x | 1 | 1 | 0 | 0 |
| y | 1 | R | 0 | 0 |
| z | 1 | R | 0 | 0 |
| w | T | T | 0 | 0 |
| M2 | | | | |
| a | 0 | 0 | 0 | 0 |
| b | 1 | 0 | 0 | 0 |
| c | 1 | 0 | 0 | 0 |
| d | T | T | 0 | 0 |
| | 0 | 0 | 0 | 0 |

FIG. 15B

After Step 4

| MTA | 1 | 2 | 3 | 4 |
|---|---|---|---|---|
| M1 | | | | |
| x | 1 | 1 | 0 | 0 |
| y | 1 | R | R | 0 | 0 |
| z | 1 | 1 | 0 | 0 |
| w | T | T | 0 | 0 |
| M2 | | | | |
| a | 1 | 0 | 0 | 0 |
| b | 1 | 0 | 0 | 0 |
| c | T | T | 0 | 0 |
| d | R | 0 | 0 | 0 |

STR has been obtained: two links on the same TDMA slot #1

FIG. 16A

Step 3

| MTA | 1 | 2 | 3 | 4 | 1 | 2 | 3 | 4 |
|---|---|---|---|---|---|---|---|---|
| M1 |   |   |   |   |   |   |   |   |
| x | 1 | 1 | 0 | 0 |   |   |   |   |
| y | 1 | R | 0 | 0 |   |   |   |   |
| z | 1 | R | 0 | 0 |   |   |   |   |
| w | 1 | 1 | 0 | 0 |   |   |   |   |
| M2 | T | T | 0 | 0 |   |   |   |   |
| a | 1 | 0 | 0 | 0 |   |   |   |   |
| b | 1 | 0 | 0 | 0 |   |   |   |   |
| c | 1 | T | 0 | 0 |   |   |   |   |
| d | 1 | 0 | 0 | 0 |   |   |   |   |

FIG. 16B

Step 4

| MTA | 1 | 2 | 3 | 4 |
|---|---|---|---|---|
| M1 |   |   |   |   |
| ⓧ | 1 | 1 | 0 | 0 |
| y | 1 | 1 | 0 | 0 |
| ⓩ | 1 | R | 0 | 0 |
| w | 1 | 1 | 0 | 0 |
| M2 | T | T | 0 | 0 |
| ⓐ | 1 | 0 | 0 | 0 |
| ⓑ | 1 | 0 | 0 | 0 |
| ⓒ | T | 0 | 0 | 0 |
| ⓓ | T | 0 | 0 | 0 |

Additional STR has been obtained: now three links on the same TDMA slots #1

FIG. 17A

Step 3

| MTA | 1 | 2 | 3 | 4 | 1 | 2 | 3 | 4 |
|---|---|---|---|---|---|---|---|---|
| M1 | 1 | 1 | 1 | 1 | 1 | 0 | 0 | 0 |
| x | 1 | 1 | 0 | 0 | 1 | 0 | 0 | 0 |
| y | 1 | R | 0 | 0 | 1 | R | 0 | 0 |
| z | 1 | 1 | 0 | 0 | 1 | 0 | 0 | 0 |
| w | 1 | T | 1 | 1 | 1 | T | 0 | 0 |
| M2 | 1 | 0 | 0 | 0 | 1 | 0 | 0 | 0 |
| a | 1 | 0 | 0 | 0 | 1 | 0 | 0 | 0 |
| b | 1 | 0 | 0 | 0 | 1 | 0 | 0 | 0 |
| c | 1 | T | 0 | 0 | 1 | T | 0 | 0 |
| d | 1 | 0 | 0 | 0 | 1 | 0 | 0 | 0 |

FIG. 17B

Step 4

| MTA | 1 | 2 | 3 | 4 | 1 | 2 | 3 | 4 |
|---|---|---|---|---|---|---|---|---|
| M1 | 1 | 1 | 1 | 1 | 1 | 0 | 0 | 0 |
| (x) | 1 | 1 | R | R | 1 | 0 | 0 | 0 |
| y | 1 | R | 1 | 1 | 1 | R | 0 | 0 |
| (z) | 1 | 1 | 1 | 1 | 1 | 0 | 0 | 0 |
| w | 1 | T | 1 | 1 | 1 | T | 0 | 0 |
| M2 | 1 | 0 | 0 | 0 | 1 | 0 | 0 | 0 |
| (a) | 1 | 0 | 0 | 0 | 1 | 0 | 0 | 0 |
| (b) | 1 | 1 | 1 | 1 | 1 | T | T | T |
| (c) | 1 | T | 1 | 1 | 1 | 0 | 0 | 0 |
| (d) | 1 | 1 | 1 | 1 | 1 | 0 | 1 | 1 |

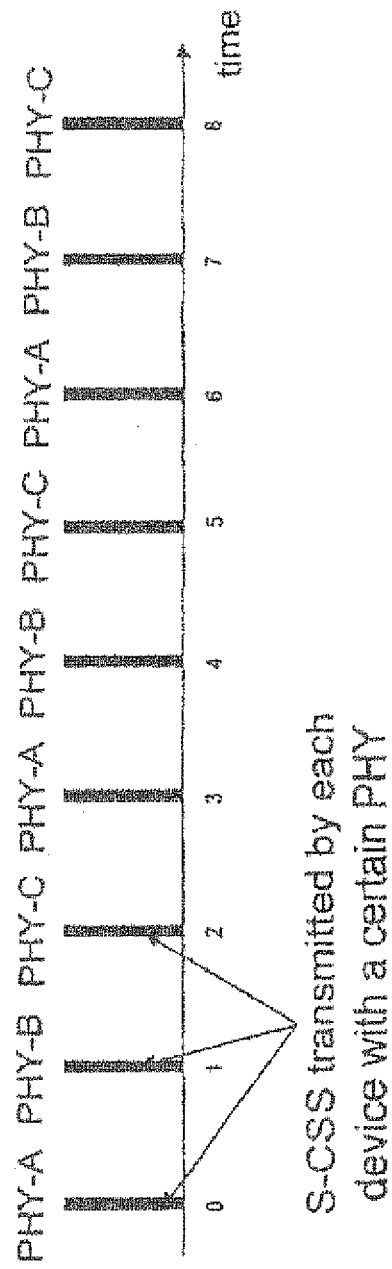
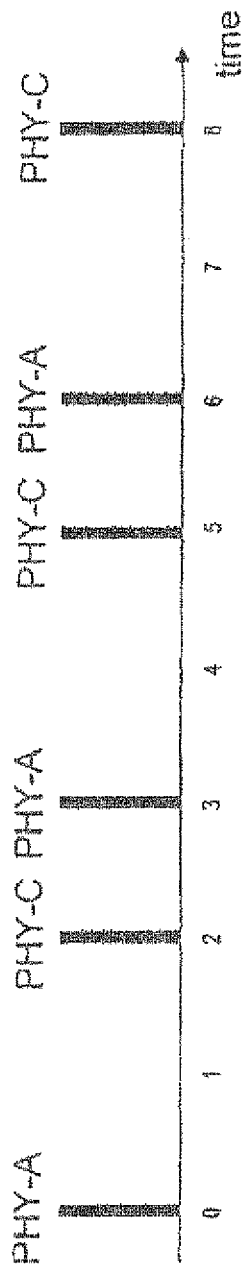
FIG. 19A
FIG. 19B

FIG. 22

TDMS duration (S=12):
➢ 3.33 ms (50 Hz) or 2.78 ms (60 Hz)

| 1 | 2 | 3 | 4 | 5 | 6 | 7 | 8 | 9 | 10 | 11 | 12 |
|---|---|---|---|---|---|---|---|---|----|----|----|
| A | A | C | C | A | A | C | C | A | A  | C  | C  |

| A | C | A | A | A | A | C | C | A | A | C | C |
|---|---|---|---|---|---|---|---|---|---|---|---|

| A | C | A | A | A | A | A | C | A | C | A | C |
|---|---|---|---|---|---|---|---|---|---|---|---|

Two PHYs are present

Two PHYs are present

TDMA structure that allows a large latency of 9.99ms(50Hz) or 8.34ms(60Hz)

TDMA structure that allows a small latency of 6.66ms(50Hz) or 5.56ms(60Hz)

FIG. 23

| | B | C | A |
|---|---|---|---|
| Pattern 1 | 10 | 10 | 10 |
| Pattern 2 | 10 | 10 | 0 |
| Pattern 3 | 10 | 0 | 10 |
| Pattern 4 | 0 | 10 | 10 |
| Pattern 5 | 1 | 0 | 0 |
| Pattern 6 | 0 | 10 | 0 |
| Pattern 7 | 0 | 0 | 10 | b0/b1 Fields of S-CSS

| | B | C | A |
|---|---|---|---|
| | 11 | 11 | 11 |
| | 11 | 11 | 0 |
| | 11 | 0 | 11 |
| | 0 | 11 | 11 |
| | 11 | 0 | 0 |
| | 0 | 11 | 0 |
| | 0 | 0 | 11 |

TDMA Structure

| | 1 | 2 | 3 | 4 | 5 | 6 | 7 | 8 | 9 | 10 | 11 | 12 |
|---|---|---|---|---|---|---|---|---|---|---|---|---|
| | D1 | D2 | B | C | A | A | B | C | A | A | B | C |
| | D1 | D2 | B | C | C | B | B | C | C | B | A | C |
| | D1 | D2 | B | B | A | B | B | A | B | A | C | B |
| | D1 | D2 | C | C | C | A | C | C | C | A | C | C |
| | D1 | D2 | B | B | B | B | B | B | B | B | B | B |
| | D1 | D2 | C | C | C | C | C | C | C | C | C | C |
| | D1 | D2 | A | A | A | A | A | A | A | A | A | A |

FIG. 24

| | b0/b1 Fields of S-CSS | | | TDM pattern | | | | | | | | | | | | |
|---|---|---|---|---|---|---|---|---|---|---|---|---|---|---|---|---|
| | B | C | A | 1 | 2 | 3 | 4 | 5 | 6 | 7 | 8 | 9 | 10 | 11 | 12 |
| Pattern 8 | 11 | 11 | 10 | D1 | D2 | B | C | C | A | B | C | A | B | B | C |
| Pattern 9 | 11 | 10 | 11 | D1 | D2 | B | B | A | A | B | A | A | A | B | C |
| Pattern 10 | 10 | 11 | 11 | D1 | D2 | C | C | A | A | B | C | A | A | C | C |
| Pattern 11 | 11 | 10 | 10 | D1 | D2 | B | B | B | A | B | B | A | A | B | C |
| Pattern 12 | 10 | 11 | 10 | D1 | D2 | C | C | C | A | B | C | A | A | C | C |
| Pattern 13 | 10 | 10 | 11 | D1 | D2 | A | A | A | A | A | A | A | A | A | C |
| Pattern 14 | 11 | 10 | 1 | D1 | D2 | B | C | B | B | B | C | C | B | B | C |

FIG. 25 b0/b1 Fields of S-CSS

| | B | C | A |
|---|---|---|---|
| Pattern 15 | 11 | 0 | 10 |
| Pattern 16 | 10 | 00 | 11 |
| Pattern 17 | 10 | 11 | 0 |
| Pattern 18 | 0 | 10 | 11 |
| Pattern 4 | 0 | 11 | 10 |

TDM pattern

| | 1 | 2 | 3 | 4 | 5 | 6 | 7 | 8 | 9 | 10 | 11 | 12 |
|---|---|---|---|---|---|---|---|---|---|---|---|---|
| Pattern 15 | D1 | D2 | B | B | A | A | A | B | A | A | B | B |
| Pattern 16 | D1 | D2 | B | A | A | A | B | A | A | A | A | B |
| Pattern 17 | D1 | D2 | B | C | C | C | B | C | C | B | B | C |
| Pattern 18 | D1 | D2 | C | C | A | A | A | C | A | A | A | C |
| Pattern 4 | D1 | D2 | C | C | A | A | A | C | A | A | C | C |

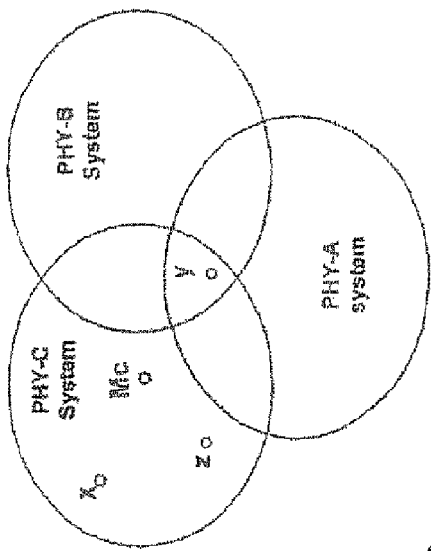

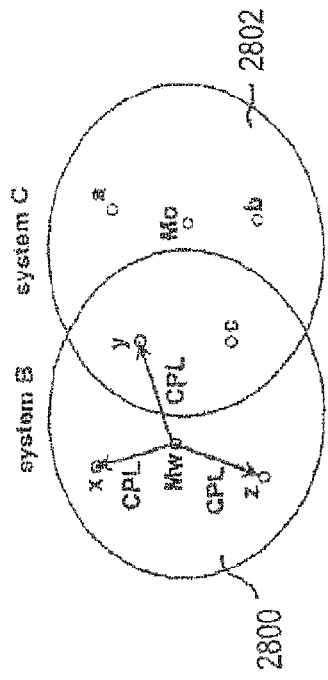
FIG. 29A
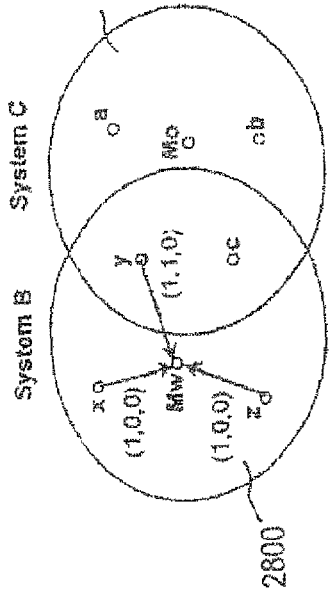
FIG. 29C
FIG. 29B
FIG. 29D

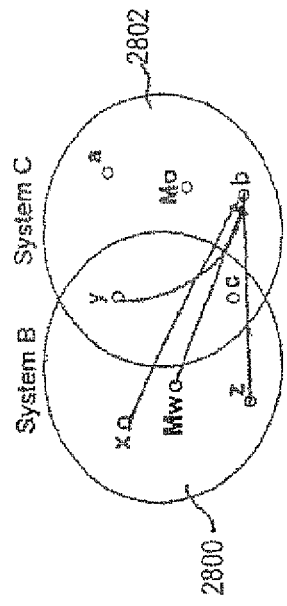
FIG. 30A
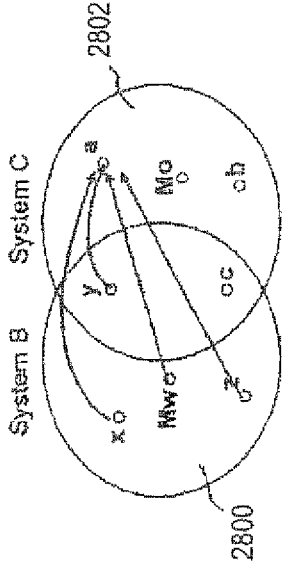
FIG. 30B
FIG. 30C
Co-existing PHY List (CPL) of AS(C)
| node | B | C | A |
|------|----|----|---|
| Mo | 10 | 11 | 0 |
| a | 10 | 10 | 0 |
| b | 0 | 10 | 0 |
| c | 10 | 10 | 0 |
FIG. 30D
IIV={00,10,00} → Pattern 6:  | D1 | D2 | C | C | C | C | C | C | C | C | C | C |
IIV={10,10,00} → Pattern 2:  | D1 | D2 | C | C | C | C | C | B | C | B | C | C |
IIV={10,11,00} → Pattern 17: | D1 | D2 | C | C | C | C | B | B | C | B | B | C |

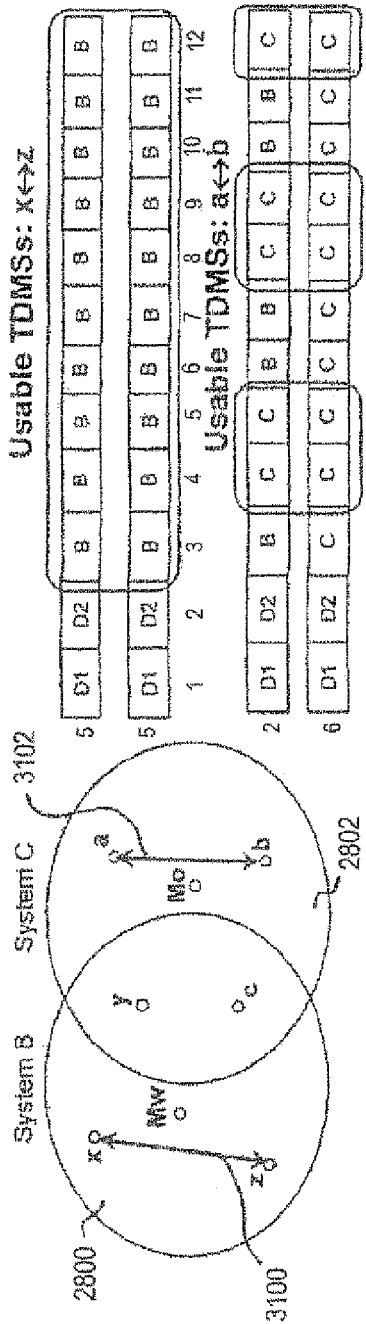

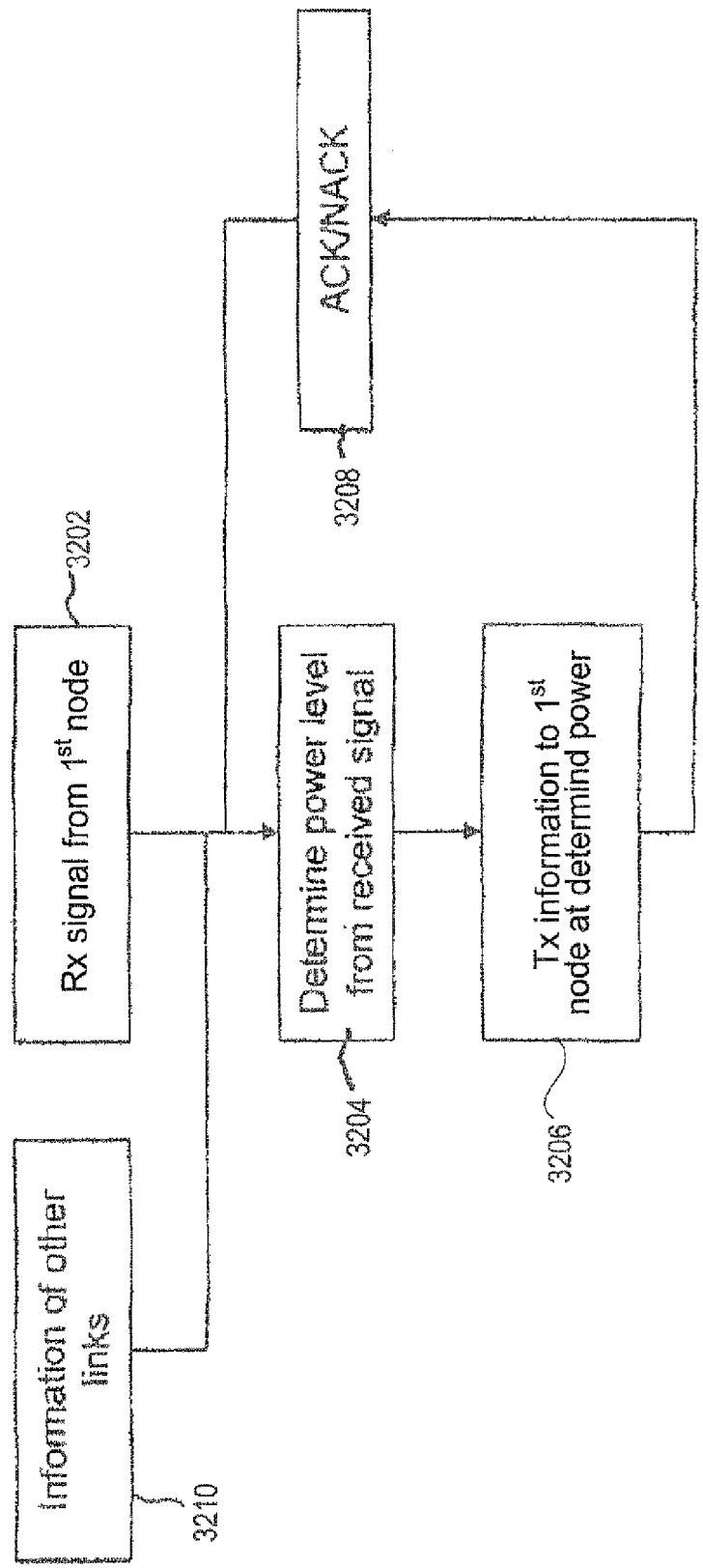

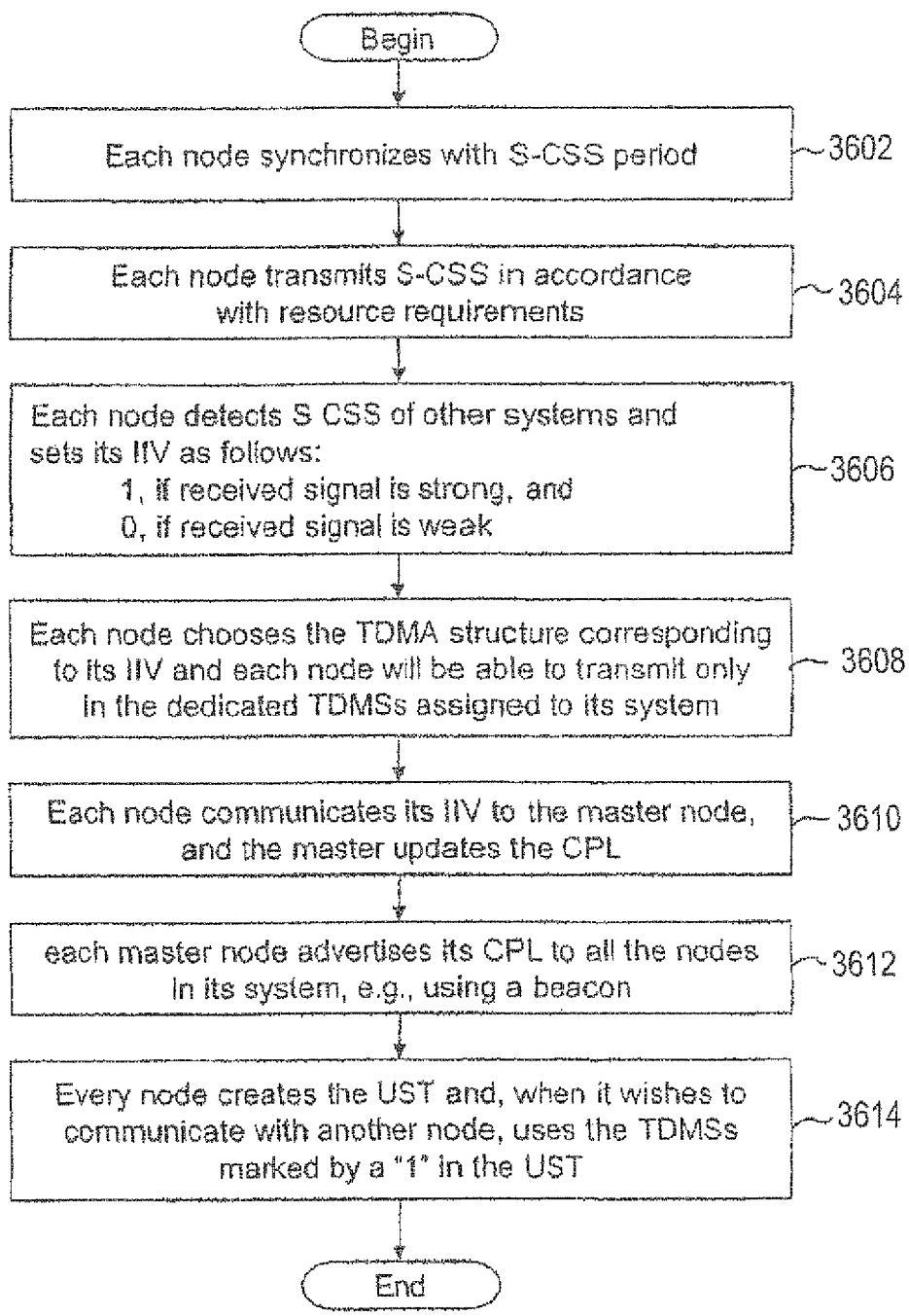

MASTER COMMUNICATION DEVICE IN A POWER LINE COMMUNICATION SYSTEM AND SLAVE COMMUNICATION DEVICE IN A POWER LINE COMMUNICATION SYSTEM

This is a continuation application of application Ser. No. 12/347,755 (now U.S. Pat. No. 8,073,015) filed Dec. 31, 2008, which is a non-provisional application of provisional application No. 61/019,052 filed Jan. 4, 2008 and provisional application No. 61/022,251 filed Jan. 18, 2008, the entire contents of each of which are incorporated by reference herein.

FIELD OF THE INVENTION

This invention relates to power line communication networks.

BACKGROUND OF THE RELATED ART

Power line cables are a pervasive medium that reaches nearly all homes and businesses and provides a very useful technique for delivering digital services to customers as well as providing local area networking (LAN) capabilities. However, power line cables are not able to provide links dedicated exclusively to a particular subscriber, as can twisted pair cables, because they are a shared medium. More specifically, power line cables that extend from a low voltage transformer to a set of individual homes or to a set of multiple dwelling units are shared among a set of users. This means that the signals that are generated by one user in one apartment or house may interfere with the signals generated in an adjacent apartment or house. Because it is impossible to locally contain the signals generated by a user, the more users in geographical proximity that use power line communications (PLCs), the more interference will be generated. As the interference increases, every user will experience a decrease of data rate as more packet collisions will occur.

This phenomenon can also occur in a single network. In fact, as the number of nodes in the network increases, the probability of packet collision grows, and the overall throughput of the single network decreases. Therefore, it would be desirable to provide to PLC devices a technique to maintain optimized performances, even in the presence of many nodes or multiple networks, with the ultimate goal of increasing overall network throughput.

SUMMARY OF THE INVENTION

The present invention is directed to protocols that will allow a single network or multiple neighboring networks to reduce mutual interference and increase their overall throughput. These protocols will be defined in two cases of practical importance: 1) homogenous networks in which all power line communication (PLC) devices of multiple networks are interoperable with respect to full power line communication in a common PHY (modulation scheme, coding scheme, bandwidth, etc.) and 2) heterogeneous networks in which devices of some PLC networks are not interoperable with PLC devices of other PLC networks with respect to full power line communication given that the devices of the different networks do not employ a common PHY. With respect to heterogeneous networks, a protocol is provided to enable coexistence via a simple signaling scheme that allows resource sharing between the devices of the multiple heterogeneous networks.

Homogeneous networks are those in which all nodes can communicate with each other using a common PHY, so that information about one PLC network can be transferred to another PLC network. Heterogeneous networks are those in which not all PLC networks can exchange information using their own native PHY. This is the case where users in different apartments or houses use different devices having different specifications, different signaling capabilities, modulation scheme, coding scheme, bandwidth, etc.

As used herein, the meaning of the term "TDMA structure" is in accordance with the illustrations of FIGS. 19(a)-25 and the accompanying discussion thereof below. The invention employs a TDMA structure in which each cellular channel is divided into Time Division Multiplexing Units (TDMUs) each composed of plural time slots (see FIG. 20). In summary, network status is associated with a certain TDMA structure within a TDMU, and two or more networks in the system are respectively assigned one or more time slots in a TDMU. As one example of plural TDMA structures available in a system, FIG. 23 shows Patterns 1-7 (TDMA structures) each of which is associated to a network status and the resource requirement advertised in fields b0 and b1, of devices of three systems having different native signaling schemes PHY-A, PHY-B and PHY-C. The TDMA structures are known to all devices in the network, and are pre-set in memory and may also be downloaded if updates are available.

The term quality of service (QoS) refers to resource reservation control mechanisms. In general, Quality of Service relates to the ability to guarantee a certain level of performance to a data flow or to provide different priority to different applications, users, or data flows. Quality of service may be based on, for example, a required bit rate, signal-to-noise ratio, packet dropping probability and/or bit error rate. For example, the QoS may be a guaranteed throughput that is needed or desired to ensure that a minimum level of quality is maintained. The QoS levels may be set by a Standards-setting organization.

In the present invention, PLC may be used for example in a home network for accessing the Internet. In such an environment, the desired QoS typically should be sufficient to achieve broadband Internet access, i.e, high data rate Internet access, Such data rates are typically in the range of 64 kbit/s up to 1.0 Mbit/s. But the present invention is not limited to any actual numerical rate of data transmission or Standard or even a broadband or high data rate environment. The specific data rate that constitutes the sufficient QoS will depend on the particular application in which this invention is employed.

Herein, the term "satisfying a particular QoS" is intended to mean satisfying a QoS at or above a given threshold. For example, if the data rate threshold is 256 kbits/s, then the particular QoS is satisfied if the data rate is greater than or equal to 256 kbits/s. The term "revising the particular QoS" is intended to mean, for example, changing the value of the threshold, for example, to a lower data rate, such as 64 kbit/s, when the reception quality of the received signal is low.

BRIEF DESCRIPTION OF THE DRAWINGS

The accompanying drawings, which are incorporated in and constitute a part of the specification, illustrate presently preferred non-limiting examples of exemplary embodiments of the invention, and, together with the general description given above and the detailed description of the preferred embodiments given below, serve to explain the principles and concepts of the invention, in which like reference characters designate like or corresponding parts throughout the several drawings. Preferred embodiments of the present invention will now be further described in the following paragraphs of the specification and may be better understood when read in conjunction with the attached drawings, in which:

FIG. 12(a) illustrates a matrix of time allocations (MTA) for the topology of FIG. 10 when there are S=6 time division multiplexing (TDM) elementary units (TEUs) and no active links;

FIG. 12(b) illustrates that elements MTA(y,1), MTA(y,2), MTA(z,1), and MTA(z,2) are set to 1 to signify that nodes y and are interdicted from transmitting/receiving (TX/RX) on TEUs #1 and #2;

FIG. 12(c) illustrates that TX-interdiction is marked scanning MNC on the destination row (row z);

FIG. 12(d) illustrates that RX-interdiction is marked scanning MNC on the source row (row y);

FIG. 13(a) illustrates the MTA for an example in which node x of FIG. 11 requests to establish a link with node z;

FIG. 13(b) illustrates the MTA for the example in which the link a→b is established;

FIG. 14(a) illustrates the MTA, upon the completion of step 3 of the quaternary STR protocol, when node x requests 2 TEUs for the link x→z in the system illustrated by FIG. 11;

FIG. 14(b) illustrates the MTA of FIG. 14(a) upon the completion of step 4 of the quaternary STR protocol;

FIG. 15(a) illustrates the MTA, upon the completion of step 3 of the quaternary STR protocol, when node a requests 1 TEU for link a→b in the system having the MTA illustrated by FIG. 14(b);

FIG. 15(b) illustrates the MTA of FIG. 15(a) upon the completion of step 4 of the quaternary STR protocol;

FIG. 16(a) illustrates the MTA, upon the completion of step 3 of the quaternary STR protocol, when node d requests 1 TEU for link d→c in the system having the MTA illustrated by FIG. 15(b);

FIG. 16(b) illustrates the MTA of FIG. 16(a) upon the completion of step 4 of the quaternary STR protocol;

FIG. 17(a) illustrates the MTA, upon the completion of step 3 of the quaternary STR protocol, when master M1 allocates 1 TEU for link M1→w in the system having the MTA illustrated by FIG. 16(b);

FIG. 17(b) illustrates the MTA of FIG. 17(a) upon the completion of step 4 of the quaternary STR protocol;

FIG. 19(a) illustrates the detection of three S-CSS waveforms indicating the existence of three different native signaling schemes;

FIG. 19(b) illustrates a refinement of FIG. 19(a) in which only two of three S-CSS waveforms are detected;

FIG. 22 illustrates two TDMA structures having S=12 time slots;

FIGS. 23-25 illustrate TDMA structures for S=12 and P=3 when two S-CSS transmission opportunity windows (fields b0 and b1) are used to advertise resource requirements;

FIG. 27(a) illustrates three systems with three different PHYs that interfere with each other;

FIG. 27(b) illustrates a co-existence PHY list (CPL) generated by the nodes of the system using PHY-C within FIG. 27(a);

FIG. 27(c) illustrates a usable slot table (UST) for the CPL of FIG. 27(b);

FIG. 29(a) illustrates, for the heterogeneous systems of FIGS. 28(a) and 28(b), that each node in system B reports its interference index vector (IIV) to master Mw;

FIG. 29(b) illustrates a CPL generated by master Mw based on the IIVs received from nodes x, y, and z;

FIG. 29(c) illustrates master Mw broadcasting the generated CPL to nodes x, y, and z through a signal, such as its beacon;

FIG. 29(d) illustrates the TDM patterns selected in accordance with the IIVs of nodes Mw, x, y, and z;

FIGS. 30(a) and 30(b) illustrate the heterogeneous systems of FIG. 28 in which nodes x, y, and z transmit IPP {b0,b1}{1, 0} and Mw transmits {1,1} and the nodes in system C create their IIVs={B,C,A} from the received IPPS;

FIG. 30(c) illustrates the CPL generated by master Mo based on the IIVs received from nodes a, b, and c;

FIG. 30(d) illustrates the TDM patterns selected in accordance with the IIVs of nodes Mo, a, b, and c;

FIG. 31(a) illustrates the heterogeneous systems of FIG. 28(a) in which a link x↔z and a link a↔b are established;

FIG. 31(b) illustrates the TDM patterns selected by nodes x and z for communication;

FIG. 31(c) illustrates the TDM patterns selected by nodes a and b for communication;

FIG. 31(d) illustrates the heterogeneous systems of FIG. 28(a) in which a link x↔y and a link a→c are established;

FIG. 31(e) illustrates the TDM patterns selected by nodes x and y for communication;

FIG. 31(f) illustrates the TDM patterns selected by nodes a and c for communication;

FIG. 32 illustrates a method for achieving STR through power control;

FIG. 36 illustrates an STR protocol for heterogeneous PHYs;

DETAILED DESCRIPTION OF THE INVENTION

Figure 1A:
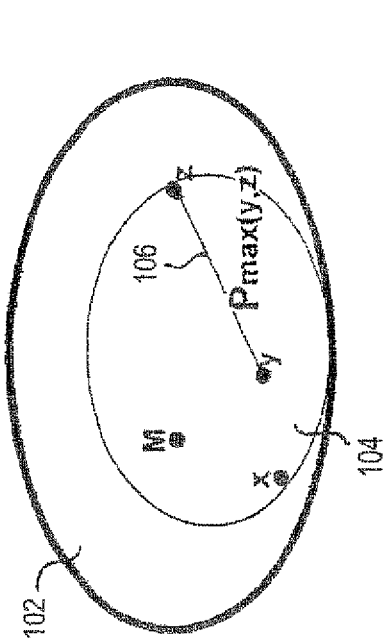
FIG. 1(a) illustrates a power line communication (PLC) network composed of four network node devices, one master M and three slaves x, y, and z.
Figure 1B:
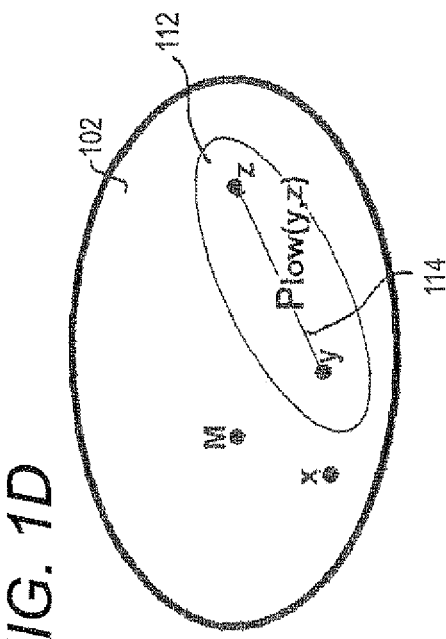
FIG. 1(b) illustrates an interference footprint (IF) of a link for node y transmitting to node z at the maximum data rate possible using a high transmit power $P_{max}(y,z)$.
Figure 1C:
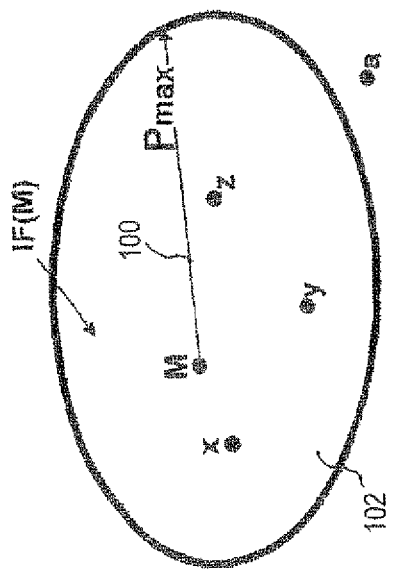
FIG. 1(c) illustrates an IF for a link of node y transmitting to node z at a lower power, $P_{med}(y,z)$, than $P_{max}(y,z)$.
Figure 1D:
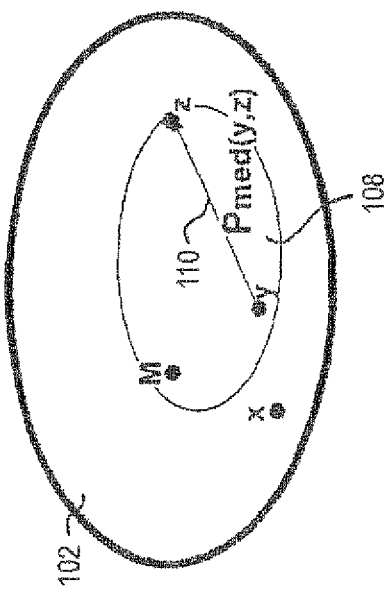
FIG. 1(d) illustrates an IF of node y transmitting to node z at a lower power, $P_{low}(y,z)$, than $P_{med}(y,z)$.

Reference will now be made in detail to the presently non-limiting, exemplary and preferred embodiments of the invention as illustrated in the accompanying drawings. The nature, concepts, objectives and advantages of the present invention will become more apparent to those skilled in the art after considering the following detailed description in connection with the accompanying drawings. The following description is provided in order to explain preferred embodiments of the present invention, with the particular features and details shown therein being by way of non-limiting illustrative examples of various embodiments of the present invention. The particular features and details are presented with the goal of providing what is believed to be the most useful and readily understood description of the principles and conceptual versions of the present invention. In this regard, no attempt is made to show structural details of the invention in more detail than is necessary for the fundamental understanding of the present invention. The detailed description considered with the appended drawings are intended to make apparent to those skilled in the art how the several forms of the present invention may be embodied in practice.

Although power line cables provide a shared communications channel to different users, the level of interference that is generated by a device into other devices in the same or another network is a random variable that depends on many factors, such as transmitted power, the topology (type of cables, length, presence and number of bridged taps, appliances plugged into the network, etc.) of the power line wiring, grounding practices, the number of mains phases delivered to the premises, distance between devices, etc. In some cases, power line communication (PLC) devices interfere more with other devices that are in spatial proximity than with devices that are located farther away, e.g., on another floor. In other cases, even within the same apartment, devices can cause very different levels of interference depending, for example, if they are located on the same phase of the alternating current (AC) mains or not.

The present invention exploits properties of the power line channel by introducing the capability of performing space and time reuse (STR), such that devices, either in the same network or in different neighboring networks, are able to transmit simultaneously without causing interference with each other. Currently, no heretofore known PLC system has this capability. Within the same network, nodes are either assigned orthogonal resources (e.g., different time division multiple access (TDMA) slots) or compete for resources (e.g., carrier sense multiple access (CSMA)). Currently, in heretofore known systems, no coordination is attempted or very little information is shared between different networks having interoperable devices. Moreover, no solution is present in heretofore known systems for coordinating networks composed of non-interoperable devices.

Several protocols for STR are presented herein for increasing overall network throughput. These protocols can be implemented independently or in conjunction and can provide different degrees of network throughput, depending on the amount of information that must be shared among devices within the same network or among different networks.

A property of the PLC channel that is exploited by these protocols is the broadcast nature of the power line channel. If node i transmits to node j, then every other node in range receives the data packet sent by node i. Therefore, any node k in range is able to detect at least the delimiter (i.e., preamble and frame control information) of the packet transmitted by i and therefore have knowledge of: (1) the source and destination addresses (SA/DA) of the link (SA of and DA of j) and (2) the level of interference generated by i on k.

In a homogenous network, all the devices in the network are interoperable and, therefore, are operable to exchange data. This capability provides efficient STR protocols that exploit device interoperability for exchanging messages between devices belonging to neighboring networks.

STR Protocol Based on Power Control

An STR power control protocol is not implemented in heretofore known PLC systems. These heretofore known systems always transmit at the maximum power allowed by regulatory constraints, even if the nodes are in close proximity. Thus, the interference generated on adjacent devices or networks often prevents other devices from being able to communicate, thereby reducing the overall throughput in the network.

FIG. 1(a) illustrates a PLC network composed of four network node devices, one master M and three slaves x, y, and z. The master M is not necessarily in the center of the network given that its range depends on the topology of the network and the range may not be symmetrical. Interference footprint (IF) 102 represents the area where a node is able to receive the master's beacon signal 100. Any node outside of IF 102 is not able to correctly receive the beacon 100 of master M and, therefore, does not belong to the network of master M, Network M. For example, node "a" does not belong to network M. The IF represents the area where the signal of the transmitting node would cause harmful interference. The IF depends only on the transmitted power.

The same transmitted power may yield different data rates between nodes due to different channel attenuations between nodes; similarly, the IF of a link is also dependent on the data rate of that link. For example, FIG. 1(*b*) illustrates an IF(y) 104 of a link 106 for node y transmitting to node z at the maximum data rate possible using a high transmit power $P_{max}(y,z)$. If node y lowered its transmit power from $P_{max}(y,z)$ down to $P_{med}(y,z)$, it would reduce its IF and still be able to reach z, although at a lower data rate. FIG. 1(*c*) illustrates an IF(y) 108 for a link 110 of node y transmitting to node z at a lower power, $P_{med}(y,z)$, than $P_{max}(y,z)$. Further reduction of the transmit power would cause further reduction of an IF(y) 112 and, at the same time, further reduction of the data rate of link y→x 114. FIG. 1(*d*) illustrates an IF(y) 112 of node y transmitting to node z at a lower power, $P_{low}(y,z)$, than $P_{med}(y,z)$. Therefore, nodes should establish links at the minimum data rate needed to support their QoS constraints and, at the same time, use the minimum transmit power required to support that data rate.

In general, all heretofore known devices in a PLC network transmit at the maximum allowed power, even if not necessary. For example, as shown in FIG. 1(*a*), master M broadcasts its beacon 100 at maximum power $P_{max}$ and this power defines the region where the beacon can be detected by other nodes.

Figure 2:
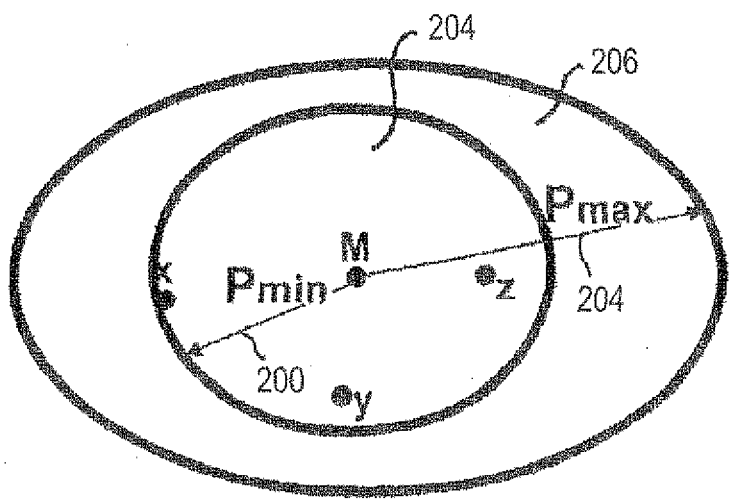
FIG. 2 illustrates the master M transmitting a beacon signal at $P_{min}$, the minimum transmit power needed to reach all of the slave nodes illustrated in FIG. 1(a)

However, the present invention recognizes that it is advantageous to employ a smaller power that is sufficient to reach all nodes of the network. FIG. 2 illustrates master M transmitting its beacon at $P_{min}$ 200, the minimum transmit power needed to reach all of the slave nodes. The area between the boundaries of $IF_{min}(M)$ 204 and $IF_{max}(M)$ 206 represents wasted power and where the master M could potentially create interference if transmitting at maximum power.

Several techniques may be utilized to allow the master to estimate the minimum transmit power necessary to reach all the slave nodes. For example, in one technique, when a slave S device is plugged in and cannot receive a master's signal, the slave transmits a specific packet at maximum power to search for a master if a master M is in range and receives the packet, the master M estimates, on the basis of the received packet, what is the required transmit power needed to broadcast its beacon to S.

Figure 3:
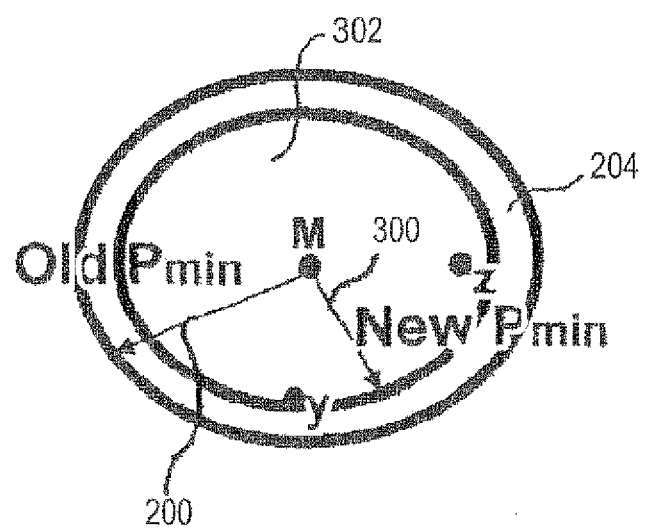
FIG. 3 illustrates the master M reducing its power relative to that illustrated in FIG. 2 so as to use the minimum power to reach the remaining nodes y and z within the network.
Figure 4A:
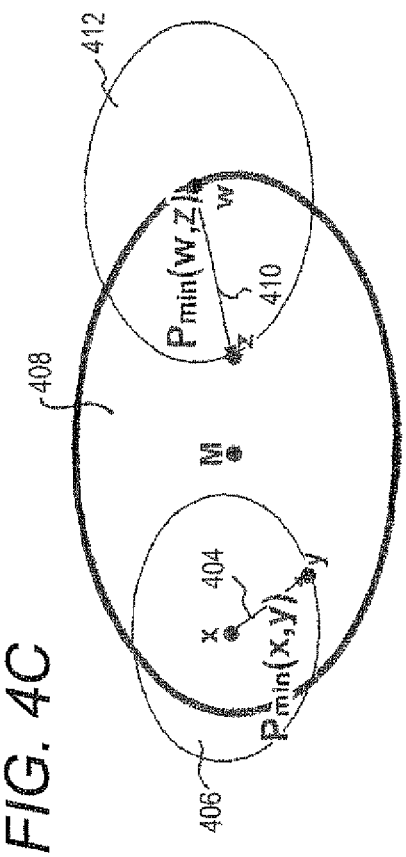
FIG. 4(a) illustrates a link in which a node x communicates to a node y with its maximum transmit power $P_{max}$.
Figure 4B:
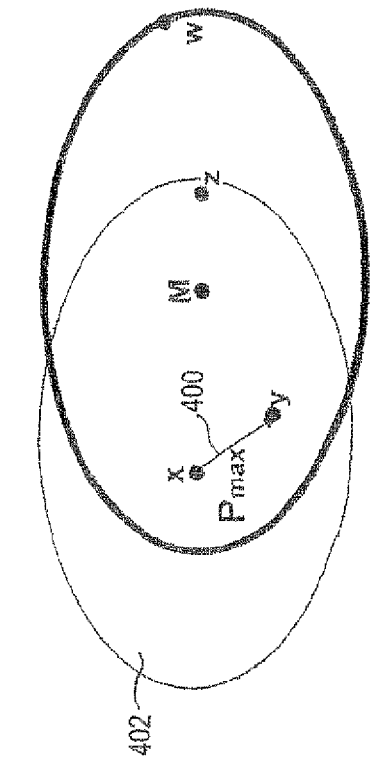
FIG. 4(b) illustrates the smaller IF of node x when applying minimum transmit power $P_{min}(x,y)$.
Figure 4C:
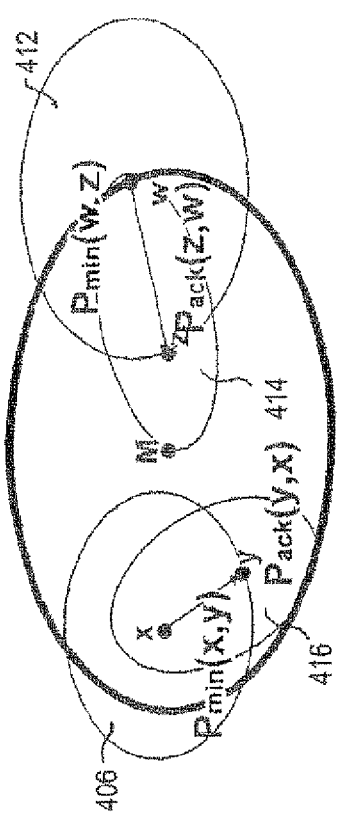
FIG. 4(c) illustrates nodes z and w communicating at the same time that nodes x and y communicate.
Figure 4D:
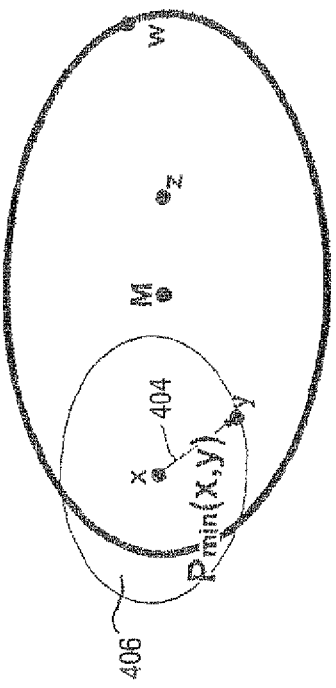
FIG. 4(d) illustrates the IFs for $P_{min}(w,z) > P_{ack}(z,w)$ and $P_{min}(x,y) > P_{ack}(y,x)$.

Such a searching packet may also be transmitted periodically or occasionally. In this case, the master periodically or occasionally updates the minimum transmitted power needed to reach all its slave nodes. For example, imagine that node x in FIG. 2 drops from the network of master M. This could happen, for example, if the node was unplugged by the user. If master M does not receive a signal from node x for a while, master M reduces its transmit power and, thereby, reduces its interference footprint to the minimum required to reach all remaining nodes. FIG. 3 illustrates the master M reducing its power relative to that illustrated in FIG. 2 so as to use the minimum power, $P_{min}$ 300, to reach the remaining nodes y and z within the network. At the reduced power setting, master M produces IF(M) 302.

The same procedure can be followed by slave nodes that wish to communicate with the master or among themselves.

FIG. 4(*a*) illustrates a link 400 in which node x communicates to node y with its maximum transmit power $P_{max}$ 400. In the figure, $IF_{max}(x)$ 402 shows that M and z receive interference but w does not. This is the manner in which heretofore known conventional devices communicate.

If node x estimated the minimum transmit power $P_{min}(x,y)$ required to communicate with node y in a link 404, then node x's $IF_{min}(x,y)$ 406 would be much smaller. FIG. 4(*b*) illustrates the smaller footprint of node x when applying minimum transmit power $P_{min}(x,y)$. In this case, nodes M, z and w do not receive any interference and would be able to communicate with each other while nodes x and y communicate. FIG. 4(*c*) illustrates nodes z and w communicating at the same time nodes x and y communicate. If node x transmitted at full power as shown in FIG. 4(*a*), then z would not be able to reliably receive packets from w because z would belong to the interference footprint 408 of x. FIG. 4(*c*) shows a feature of STR capability: two links are simultaneously active (link x→y 404, link w→z 410) without causing each other harmful interference. Stated another way, $IF_{min}(x,y)$ 406 and $IF_{min}(w,z)$ 412 do not overlap at node points x, y, z, or w.

In practice, a receiving node also transmits acknowledgment packets (ACK) to the sender. Therefore, when a link is established, there are two interference footprints to consider, one centered on the sender and one centered on the receiver. However, because ACK packets are usually transmitted in diversity mode and at a lower data rate than the payload packets sent by the transmitter, the IF generated by the receiver due to the transmission of ACK packets is generally much smaller than the IF of the sender that is transmitting at much higher power to accommodate a higher data rate. FIG. 4(*d*) illustrates the IFs for $P_{min}(w,z) > P_{ack}(z,w)$ and $P_{min}(x,y) > P_{ack}(y,x)$. If $IF_{ACK}(z,w)$ 414 is smaller than $IF_{min}(w,z)$ 412 but $P_{ack}(z,w)$ is sufficient to allow node w to reliably detect the ACK packets transmitted by z. A similar situation is shown for link x→y 408, where $IF_{ACK}(z,w)$ 416 represents the IF of ACK packets transmitted by y.

In the previous example, no data needed to be exchanged between the nodes to establish the two simultaneous links. However, this will not always be desirable or possible. For example, in the case where many links must be established, it is desirable to assign different TDMA slots only to those links that really require orthogonal resources.

Figure 5A:
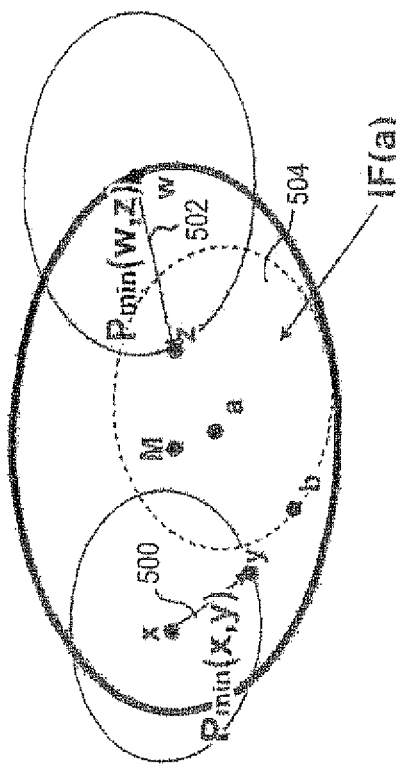
FIG. 5(a) illustrates two simultaneously active links (x→y, w→z)
Figure 5B:
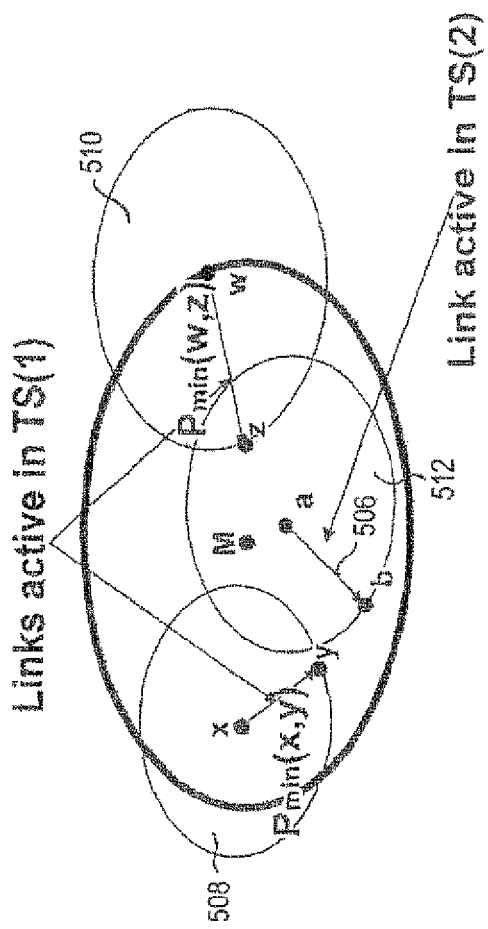
FIG. 5(b) illustrates links (x→y, w→z) generating $IF_{min}(x,y)$ and $IF_{min}(w,z)$ in time slot TS(1) and link (a→b) generating $IF_{min}(a,b)$ in time slot TS(2)

FIG. 5(*a*) illustrates two simultaneously active links (x→y 500, w→z 502). Node a wishes to communicate to node b, however its interference footprint IF(a) 504 would degrade the existing link w→z 502 as z belongs to IF(a) 504. In this case, it is necessary to orthogonalize resources and the master M directs the two links (x→y 500, w→z 502) to use a certain time slot TS(1), whereas it would direct the link (a→b) 506 to use a different time slot TS(2). FIG. 5(*b*) illustrates links (x→y 500, w→z 502) generating $IF_{min}(x,y)$ 508 and $IF_{min}(w,z)$ 510 in time slot TS(1) and link (a→b) 506 generating $IF_{min}(a,b)$ 512 in time slot TS(2).

The master is operable to detect if IF(a,b) 512 affects any existing link. In fact, once the link a→b 506 is established, an adversely affected node will start experiencing a higher packet loss and informs the master M. The master, on the basis of pre-set policies (e.g., priority mechanisms, etc.), will broadcast with the beacon signal a set of actions or will inform the involved nodes. Examples of actions are to: (1) instruct a node to use a different time slot or (2) instruct a node to reduce its data rate, thus reducing its transmit power and its IF.

Similarly, given the dynamic nature of links, in one embodiment, a master instructs a node to increase the data rate of its active link, thus increasing its transmit power and IF, if conditions allow.

If all PLC nodes operated using the above-described power control feature, network throughput would be greatly improved because the IF of every ongoing communication would be reduced. A PLC network can implement this novel strategy autonomously and without exchanging any information. In the case of heterogeneous PLC networks, according to an embodiment of this invention, every PLC network is operable to implement this strategy, in that every PLC network autonomously reduces the IF of its links without requiring the exchange of any data between devices or masters.

Figure 6:
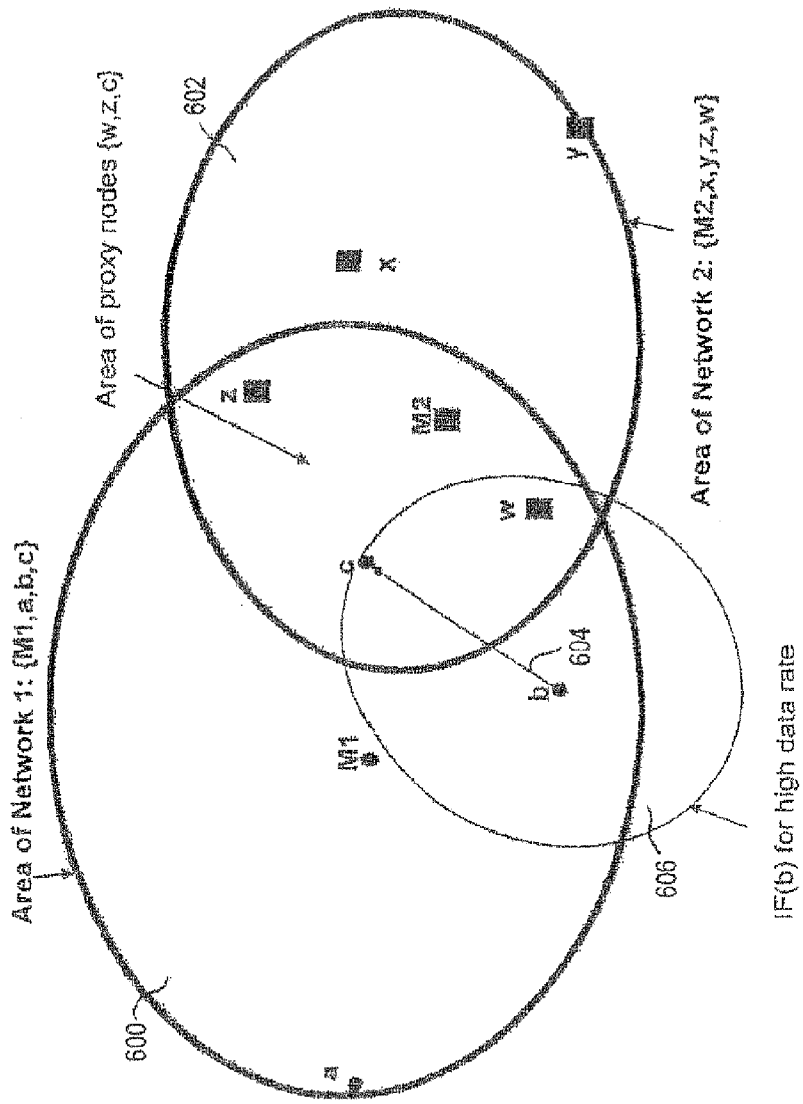
FIG. 6 illustrates a system in which network 1 is defined by master M1 and includes nodes {a,b,c} and network 2 is defined by master M2 and includes nodes {x,y,z,w}.

By allowing nodes in one network to communicate with nodes in another network, it is possible to further improve STR efficiency. Consider an example in which two homogenous PLC networks are present. FIG. 6 illustrates a system in which network 1 with IF 600 is defined by master M1 and includes nodes {a,b,c} and network 2 with IF 602 is defined by master M2 and includes nodes {x,y,z,w}. In this example, master M1 transmits its beacon at a higher power than M2. Nodes {M2,a,b,c,z,w} receive the beacon of master M1 and nodes {x,y,z,w,c} receive the beacon of master M2. Nodes {M2,w,z,c} receive the beacons of both masters. Slave nodes that receive multiple masters are special nodes and are sometimes referred to as proxy nodes. A proxy node is in charge of relaying management packets from the master of one network to the master of another network. Proxy nodes are also in charge of ensuring correct re-synchronization of neighboring systems.

FIG. 6 further illustrates that there is an active link 604 between nodes b and c with the corresponding IF(b,c) 606 including node w. Node w may not be able to receive data at a high data rate because it is in IF(b,c) 606 and, therefore, receives interference from node b. However, node w (which is a proxy node) can request master M1 to instruct node b to reduce its IF (this is possible because node w detects the delimiter transmitted by b and knows that SA=b and DA=c). On the basis of pre-set policies, M1 can either grant or decline such a request. If the request is granted, master M1 instructs b to reduce its transmit power so as to reduce its IF 606. As a consequence, link b→c 604 may experience a reduction of throughput.

Figure 7:
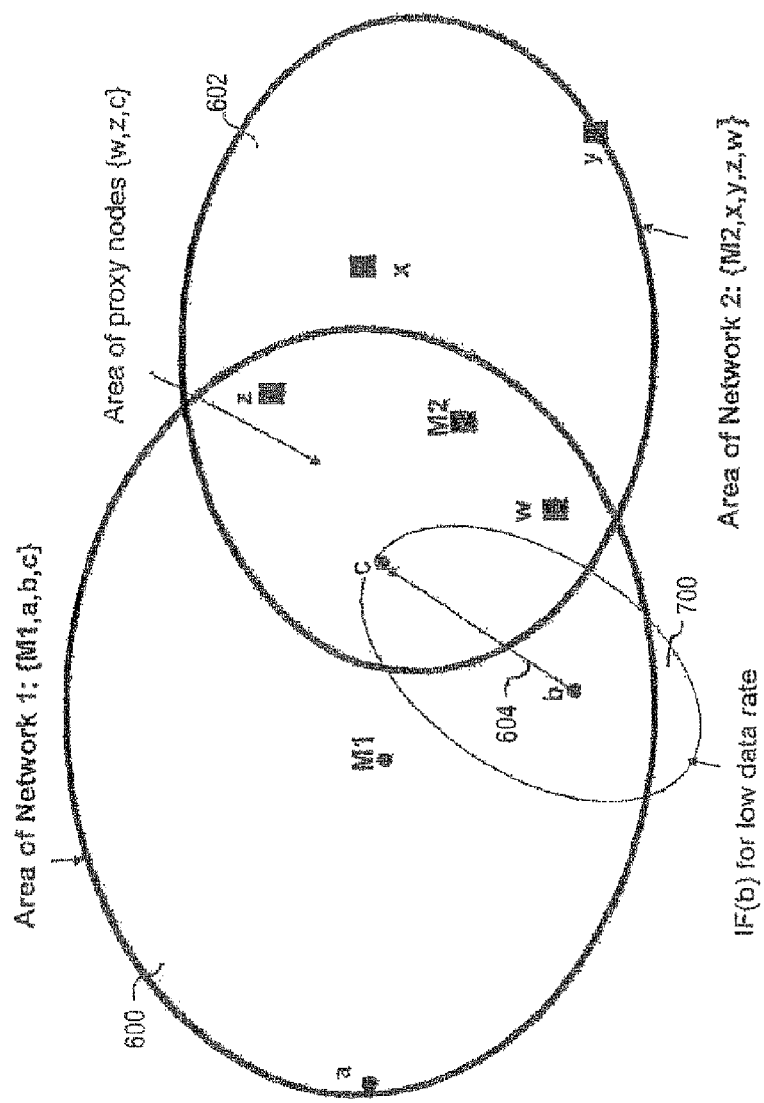
FIG. 7 illustrates a refinement of FIG. 6) in which a reduction of power for link b→c causes node w to fall outside IF(b,c) so that node w can receive data reliably from any node in network 2.

FIG. 7 illustrates a refinement of FIG. 6 in which a reduction of power for link b→c 604 causes node w to fall outside IF(b,c) 700 so that node w can receive data at a high rate from any node in network 2. If the QoS constraints of b do not allow a reduction of data rate, then master M1 could also direct link b→c 604 to another time slot in order to avoid the interference.

Figure 8:
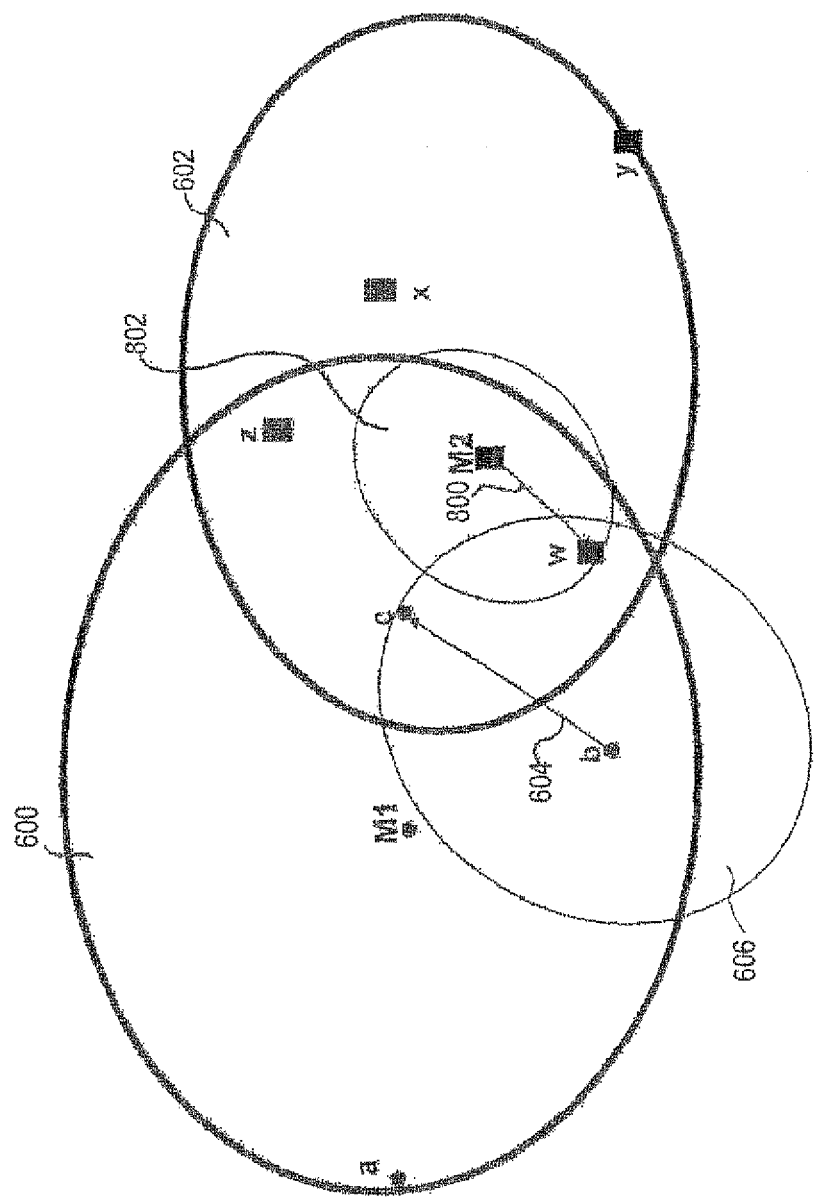
FIG. 8 illustrates a refinement of FIG. 6 in which a link M2→w may coexist with an interfering link b→c.

It is also possible that a node can communicate and satisfy its QoS constraints even if it belongs to the IF of another node. For example, consider again the case shown in FIG. 6 where a high data rate link between b and c is active and node w belongs to IF(b,c) 606. If master M2 wishes to communicate with node w, it may do so without requesting b to reduce its IF. In fact, given the close proximity of M2 and w, their link will experience very little attenuation. In this case, M2 may be able to employ a small amount of transmit power to overcome both channel attenuation and interference from b. If this is possible, then link M2→w 800 will be established without the necessity of requesting the reduction of IF(b,c) 606. FIG. 8 illustrates a refinement of FIG. 6 in which a link M2→w 800 may coexist with an interfering link b→c 604. Link M2→w 800 produces $IF_{min}(M2,w)$ 802.

Figure 9:
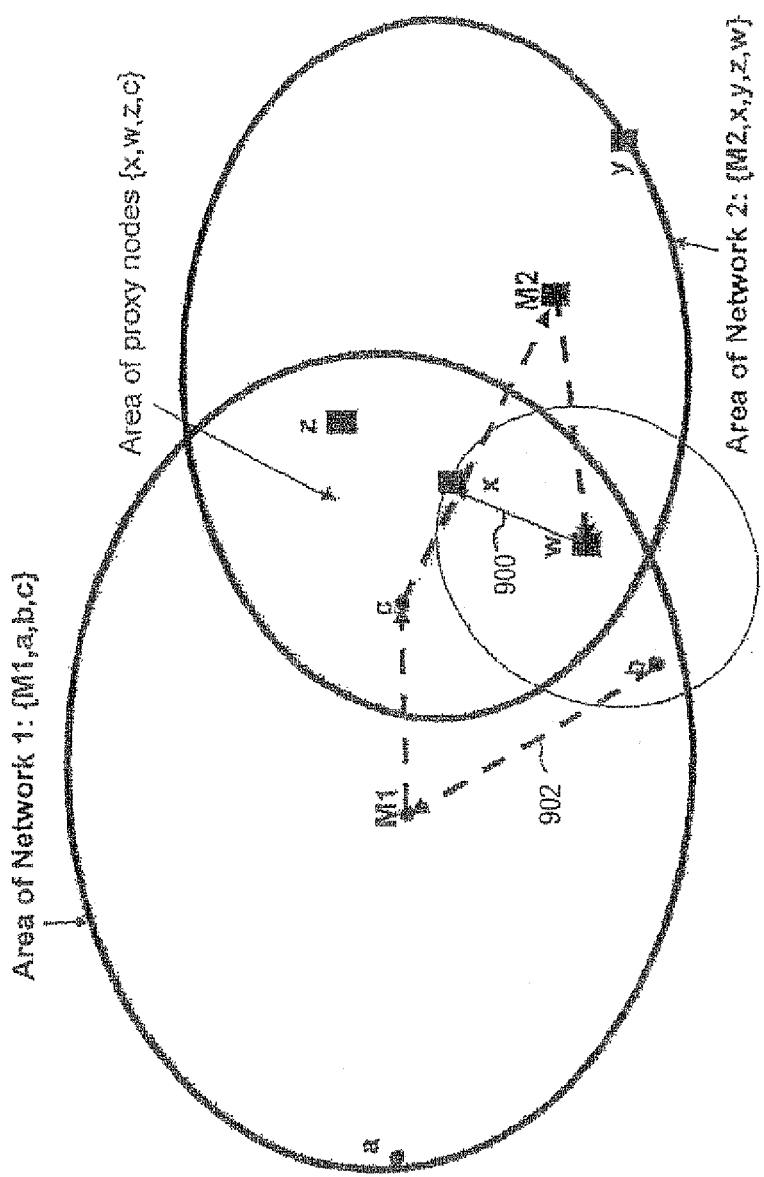
FIG. 9 illustrates a refinement of FIG. 6 in which a link w→x disturbs node b but node b cannot communicate directly with a master M2 of the interfering link.

In the previous examples, proxy node w receives interference and could directly contact master M1 of the other network. In the general case in which the disturbed node is not a proxy node, a node would send to its own master a request for a change in the IF of an interfering node in another system. The master would then relay such a request to the other system either directly, if the masters are in range, or by relay via proxy nodes if masters cannot communicate directly. FIG. 9 illustrates a refinement of FIG. 6 in which link w→x 900 disturbs node b but node b cannot communicate directly with M2. As shown by the dashed path 902, b sends a request to M1, M1 relays the request to proxy node c, and node c relays the request to master M2. Masters M1 and M2 can make local decisions, on the basis of pre-set policies, whether to relay or grant the request.

Similar considerations are applied to extend the technique to the case of more than two networks, either homogeneous or heterogeneous. In the case of heterogeneous networks, there is the issue that nodes which do not have the same PHY or media access control (MAC) are not capable of communicating with each other. In this case, the invention provides an embodiment in which a communication device that is common to all PLC devices is utilized so that some data exchange can be performed. This common inter-PHY communication capability can be very rudimentary or more sophisticated depending on what and how much information will be exchanged between heterogeneous systems.

FIG. 32 illustrates a method for achieving STR through power control. A first network node communicates 3202 a signal to a second network node. Based on either the reception quality of the received signal or power control information communicated within the received signal, the second network node determines 3204 an appropriate power level for communicating information to the first network node. Thereafter, the second network node transmits 3206 the information to the first network node at the determined power level. Upon receiving the transmitted information, the first network node communicates 3208 a signal to the second network node indicating whether the signal was received properly. This signal may be, for example, an acknowledgment/no acknowledgment (ACK/NACK) signal and may include power control feedback information. If the second network node has additional information to communicate to the first network node, then the second network node determines 3204 the appropriate power level for communicating the additional information based on either the receive quality of the ACK/NACK signal or the content of the ACK/NACK signal. For each determination 3204 of the power level setting, the second network node may also consider 3210 the status of other links existing in its network or neighboring networks.

Figure 37A:
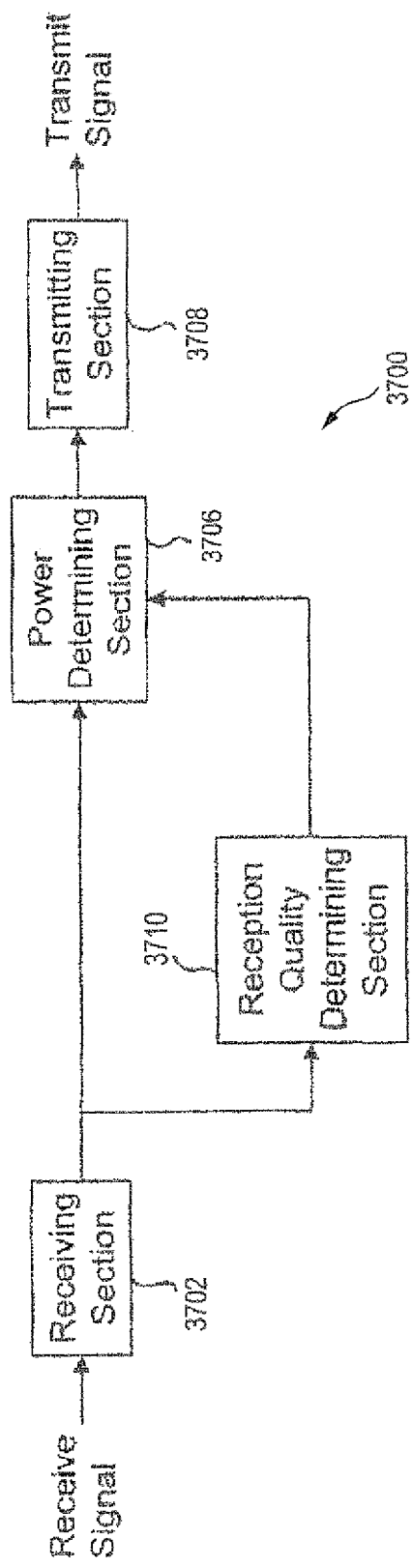
FIG. 37(a) illustrates a PLC power control apparatus.

FIG. 37(a) illustrates a PLC power control apparatus 3700 having a receiving section 3702 that receives a signal communicated from a PLC node. A power determining section 3706 determines, based on the received signal, the power required to communicate information to the PLC node while satisfying a particular QoS. A transmitting section 3708 transmits the information in a transmit signal to the PLC node at the determined power.

The power required to communicate the information to the PLC node, while satisfying the particular QoS, is determined from the reception quality of the received signal determined by a reception quality determining section 3710. Alternatively, the required power is determined from power control information communicated within the received signal.

Receiving section 3702 receives an acknowledgment signal from the PLC node for the communicated information. Based on the received acknowledgment signal, power determining section 3706 revises the power required to communicate subsequent information to the PLC node, and transmitting section 3708 transmits the subsequent information to the PLC node at the revised power. Alternatively, power determining section 3706 revises the particular QoS for communicating subsequent information to the PLC node based on the reception quality of information communicated in another link, and the subsequent information is transmitted by transmitting section 3708 to the PLC node at a power commensurate with the revised QoS. This other link may not involve apparatus 3700; that is, the link may be between nodes other than apparatus 3700. If the other link is received by a node other than PLC power control apparatus 3700, then an indication of the revised QoS is communicated to PLC power control apparatus 3700 by a master node either directly or indirectly via a third node.

In one aspect, power determining section 3706 determines whether its communication link with the PLC node will adversely affect another communication link. If so, power determining section 3706 assigns orthogonal communication resources to the two links so that information may be communicated over the two links using the orthogonal communication resources to avoid the adverse effects.

Figure 37B:
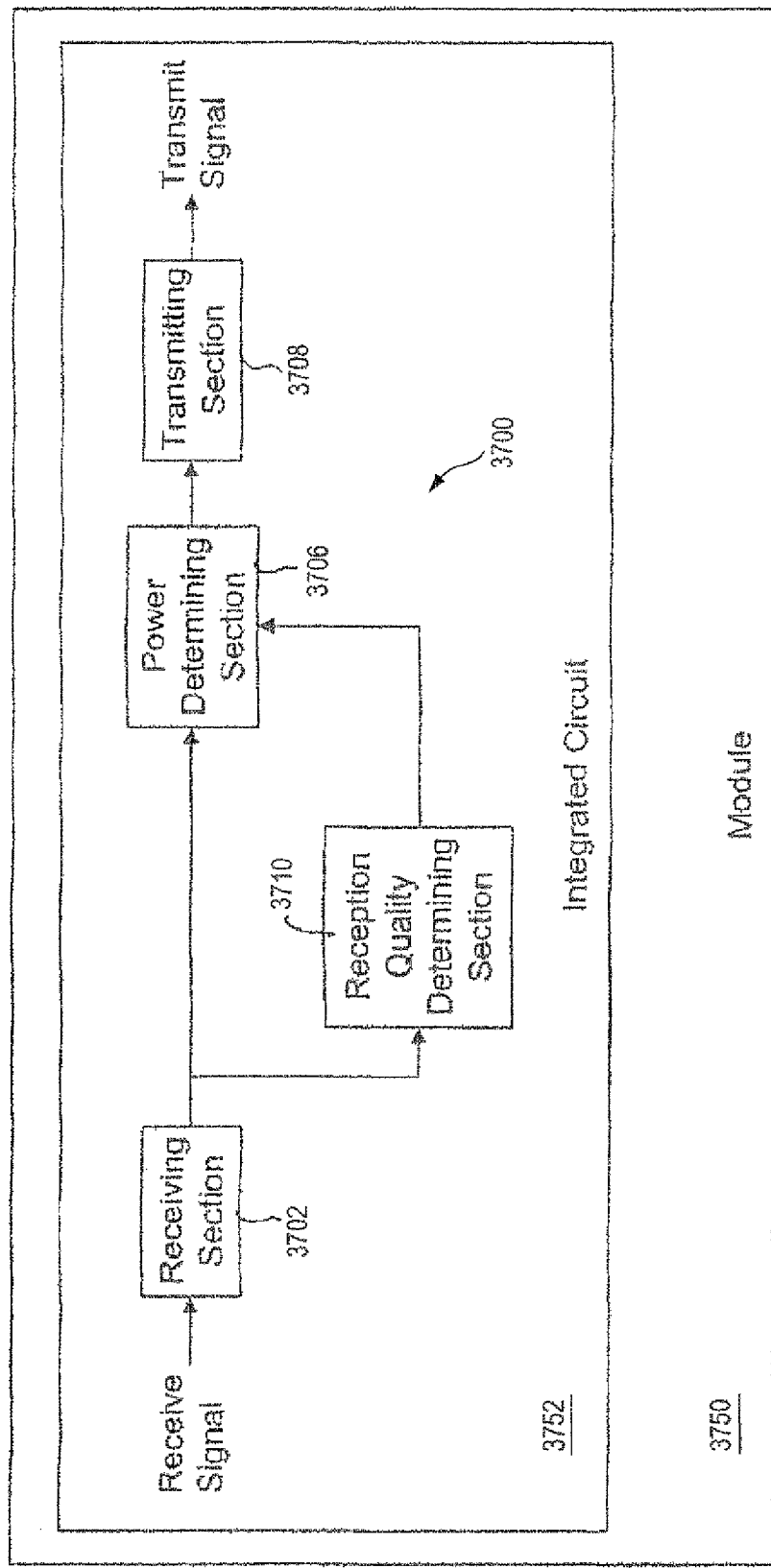
FIG. 37(b) illustrates a PLC integrated circuit module having an integrated circuit that includes the PLC power control apparatus of FIG. 37(a)

FIG. 37(*b*) illustrates a PLC integrated circuit module 3750. PLC integrated circuit module 3750 has an integrated circuit 3752 that includes PLC power control apparatus 3700.

Additional STR protocols are described below that rely upon an exchange of information between neighboring networks. The following protocols do not necessarily require that devices use power control to limit interference. However, these protocols can be used in combination with power control to further increase the prospective overall network throughput.

STR Protocol Based on a Matrix of Node Connectivity

Consider a case in which all PLC devices in all neighboring PLC networks are homogeneous, i.e., they are interoperable and can communicate data to each other. A PLC network will be called an autonomous system (AS).

In every beacon interval, there is a contention window (CW) and a contention-free window (CFW). Assume that the CFW can be divided in multiple time division multiplexing (TDM) elementary units (TEUs) of time. A TEU is the minimum amount of time that a master can allocate to nodes for TDMA, and there are STEUs in a CF window. N denotes the total number of nodes in all ASs.

In this embodiment, the STR protocol employs: (1) a matrix of node connectivity (MNC), an N×N matrix, and (2) a matrix of time allocations (MTA), an N×S matrix.

Matrix of Node Connectivity (MNC)

If i and j are two nodes, $SNR_{ij}$ denotes the SNR at which they can receive each other. The MNC is built on the basis of the $SNR_{ij}$. MNC can be either binary or not.

If MNC is binary, then $SNR_{TH}$ is defined as the threshold level for harmful interference. If MNC is not binary, the value of element MNC(i,j) depends on the level of $SNR_{ij}$; this allows for more granularity in the description of the level of interference that two nodes can withstand.

Channel attenuation is generally symmetric because the power line channel transfer function is isotropic. This means that MNC is a symmetric matrix: MNC(i,j)=MNC(j,i). Although the transfer function is symmetric, the power line channel may not be symmetric as noise generated by appliances is characterized by locality. In order to include noise in the MNC, non-symmetric entries are forced. For example, if either nodes i or j are in a noisy state (e.g., noisy appliance nearby), this is represented by forcing MNC(i,j)≠MNC(j,i).

For example, MNC(i,j)>MNC(j,i) is set to represent that node i is in a noisy state (for i>j) or vice versa (i<j).

For example, if MNC is binary, then elements MNC(i,j) are as follows: (1) MNC(i,j)=1, nodes i and j communicate reliably with each other at an SNR>$SNR_{TH}$ and (2) MNC(i,j)=0, nodes i and j do not substantially interfere with each other and cannot reliably communicate with each other because their respective SNRs are less than $SNR_{TH}$.

If MNC is ternary, elements MNC(i,j) could be as follows: (1) MNC(i,j)=0, nodes i and j receive each other at an 0<SNR<$SNR_{TH1}$, i.e., nodes i and j do not substantially interfere with each other and cannot reliably communicate with each other, (2) MNC(i,j)=1, nodes i and j receive each other at an $SNR_{TH1}$<SNR<$SNR_{TH2}$, and (3) MNC(i,j)=3, nodes i and j receive each other at an SNR>$SNR_{TH2}$, where $SNR_{THx}$(x=1, 2) are different thresholds.

Figure 10:
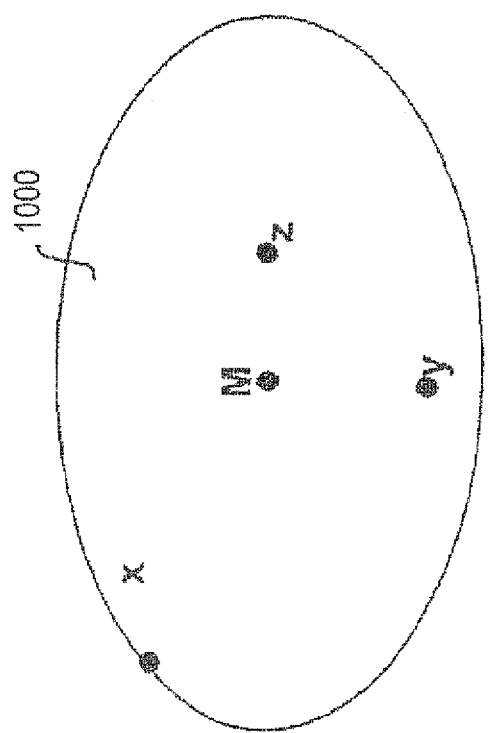
FIG. 10 illustrates a network diagram and a matrix of node connectivity (MNC) for an autonomous system having one master and three slave nodes.

FIG. 10 illustrates a network diagram 1000 and an MNC 1002 for an autonomous system having one master M and three slave nodes {x,y,z}. Although not necessary, master M uses power control so that the transmitted power used for its beacon is the minimum required to reach all three nodes. The associated binary MNC 1002 has the following meaning: (1) master M can transmit (TX)/receive (RX) to/from all nodes with SNR>$SNR_{TH}$, (2) node y can TX/RX to/from node z with SNR>$SNR_{TH}$, and (3) node x cannot TX/RX to/from nodes y and z with SNR>$SNR_{TH}$. This means that nodes y and z will always be out of IF(x) and, vice versa, that x will be always out of IF(y) and IF(z). In FIG. 10, 1 represents a first link qualifier and 0 represents a second link qualifier, as used herein.

Figure 11:
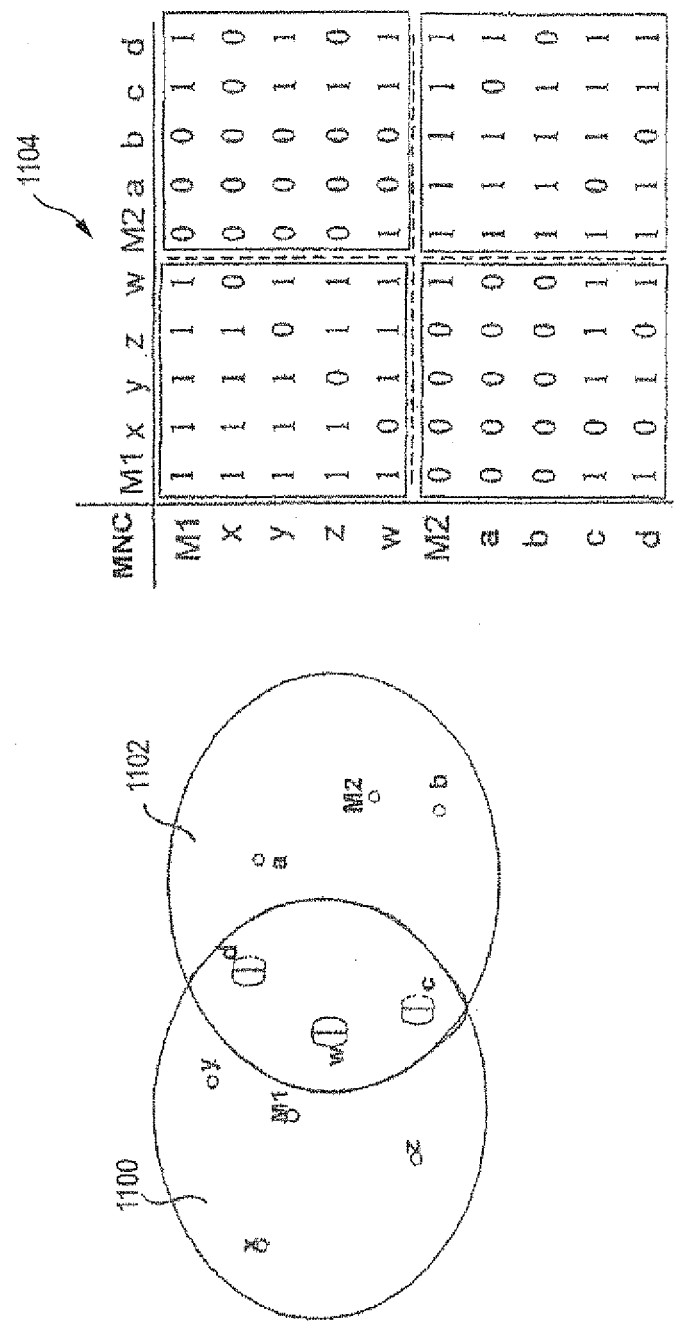
FIG. 11 illustrates neighboring autonomous systems (ASs) AS1 and AS2.

FIG. 11 illustrates neighboring autonomous systems AS1 1100 and AS2 1102. As illustrated in FIG. 11: (1) AS1={M1,x,y,z,w} and (2) AS2={M2,a,b,c,d}. The autonomous systems AS1 and AS2 have proxy nodes {c,d,w} and the number of nodes in systems AS1 and AS2 is: (1) N1=5, (2) N2=5, and (3) N=N1+N2=10. For this example, the nodes do not use power control (although as noted elsewhere herein, this technique can be used with power control). The associated binary MNC 1104 has the following meaning: (1) master M1 can TX/RX to all nodes in AS1 and to {c,d} of AS2 with SNR>$SNR_{TH}$, (2) master M2 can TX/RX to all nodes in AS2 and to w of AS1 with SNR>$SNR_{TH}$, (3) node x can TX/RX to all nodes in AS1 except w with SNR>$SNR_{TH}$, (4) node x will not interfere with any node of AS2, (5) node y can TX/RX to all nodes in AS1 except z with SNR>$SNR_{TH}$, and (6) node y will only interfere with nodes {c,d} in AS2.

Matrix MNC can be built and updated in several ways. For example, because the power line channel is a broadcast channel, packets transmitted by node i to node j are also received by node k. Node k can build part of the MNC by "sniffing" packets and measuring the power level at which packets are received. More specifically: (1) nodes detect the source address (SA) from packets transmitted by other nodes, (2) on the basis of the SA, every node builds a row of the MNC, and (3) nodes periodically send their MNC row to the master node.

The MNC can also be built actively. Specifically, the nodes may transmit special packets at regular intervals to allow other nodes to build their MNC row. Alternatively, nodes may send, at regular intervals, their MNC row to the master to enable the master to build the full MNC and then broadcast the full MNC, or just the part that needs updating, with a beacon so that every node in the network can update and maintain the full MNC.

In a distributed implementation, nodes send their MNC row to all other nodes in range as broadcast packets. All nodes in range then update their MNC with this information. Nodes not in range would not receive the packet and this would not matter as they would not be in interference range.

Because channel characteristics, including attenuation, are time varying and synchronous to the AC cycle of the mains, in one embodiment, nodes maintain multiple MNCs, one per each phase region for the AC cycle.

Matrix of Time Allocations (MTA)

If there are S TEUs of time in the CFW of a beacon interval, the MTA is an N×S matrix, where available, and forbidden TEUs are marked. For example, in the case of binary marking {0,1}: (1) MTA(i,j)=0 means that node i can use a TEU #j for a link and (2) MTA(i,j)=1 means that TEU #j cannot be used for a new link by node i, either because node i already has a link active on that TEU or because that TEU is in use by another node that interferes with node i. In the quaternary marking case {0,1, T, R}: (1) MTA(i,j)=0 means that node i can use TEU #j for a link, (2) MTA(i,j)=1 means that node i cannot use TEU #j for a link, (3) MTA(i,j)=T means that node i is forbidden from transmitting on TEU #j, and (4) MTA(i,j)=R means that node i is forbidden from receiving on TEU #j. A quaternary MTA increases the spatial reuse factor in some topologies because it differentiates between interdiction in transmission and reception.

The marking of the TEUs in the MTA depends on the topology, which is represented by the MNC. Given a link x→y, the following rules exist: (1) transmission-interdiction is marked scanning the MNC on the y-row and (2) receive-interdiction is marked scanning the MNC on the x-row.

FIG. 12(a) illustrates the MTA for the topology of FIG. 10 when there are S=6 TEUs and no active links. In this MTA, the elements are all zeros.

Assume that a link y→z is established between nodes y and z using TEUs #1 and #2. FIG. 12(b) illustrates that elements MTA(y,1), MTA(y,2), MTA(z,1), and MTA(z,2) are set to 1 to signify that nodes y and z are interdicted (i.e., forbidden or precluded) from TX/RX on TEUs #1 and #2. FIG. 12(c) illustrates that TX-interdiction is marked scanning the MNC on the destination row, row z. Because MNC(z,M)=1, MTA(M,1)=MTA(M,2)=T is marked, as shown in FIG. 12(c). FIG. 12(d) illustrates that RX-interdiction is marked scanning the MNC on the source row, row y. Because MNC(y,M)=1, MTZ(M,1)=MTA(M,2)=R. However, because these two elements were already marked as "1," both are marked as "1" to signify both TX and RX interdiction, as shown in FIG. 12(d).

FIG. 12(d) shows the final MTA after link y→z has been established on TEUs #1 and 2. If MTA(i,j)=0, it means that ode i can use TEU #j for establishing an active link.

Consider the system in FIG. 11 which shows two ASs and their associated MNC 1104. Assume that MNC 1104 is already known, S=4, and the MTA is quaternary. FIG. 13(a) illustrates the MTA for an example in which node x of FIG. 11 requests a link with node z. FIG. 13(b) illustrates the MTA for the example in which the link a→b is established.

In a centralized scheme: (1) only the master maintains and updates the MTA, (2) nodes must send a request to the master to obtain a TDMA allocation, (3) the master advertises the TDMA allocations in a beacon, (4) the master advertises the MTA sub-matrix pertaining to its own AS in the beacon, and (5) proxy nodes inform other masters of the MTA sub-matrices transmitted in the beacon of the first master.

In a distributed scheme: (1) all nodes maintain and update the MTA, (2) the master may advertise the MTA in the beacon, (3) nodes autonomously decide the allocation of TEUs and then send management protocol data units (PDUs) to the master, the master then broadcasts a new TDM allocation to the whole network, and (4) proxy nodes inform neighboring ASs.

Description of MNC/MTA STR Protocol

Figure 35A:
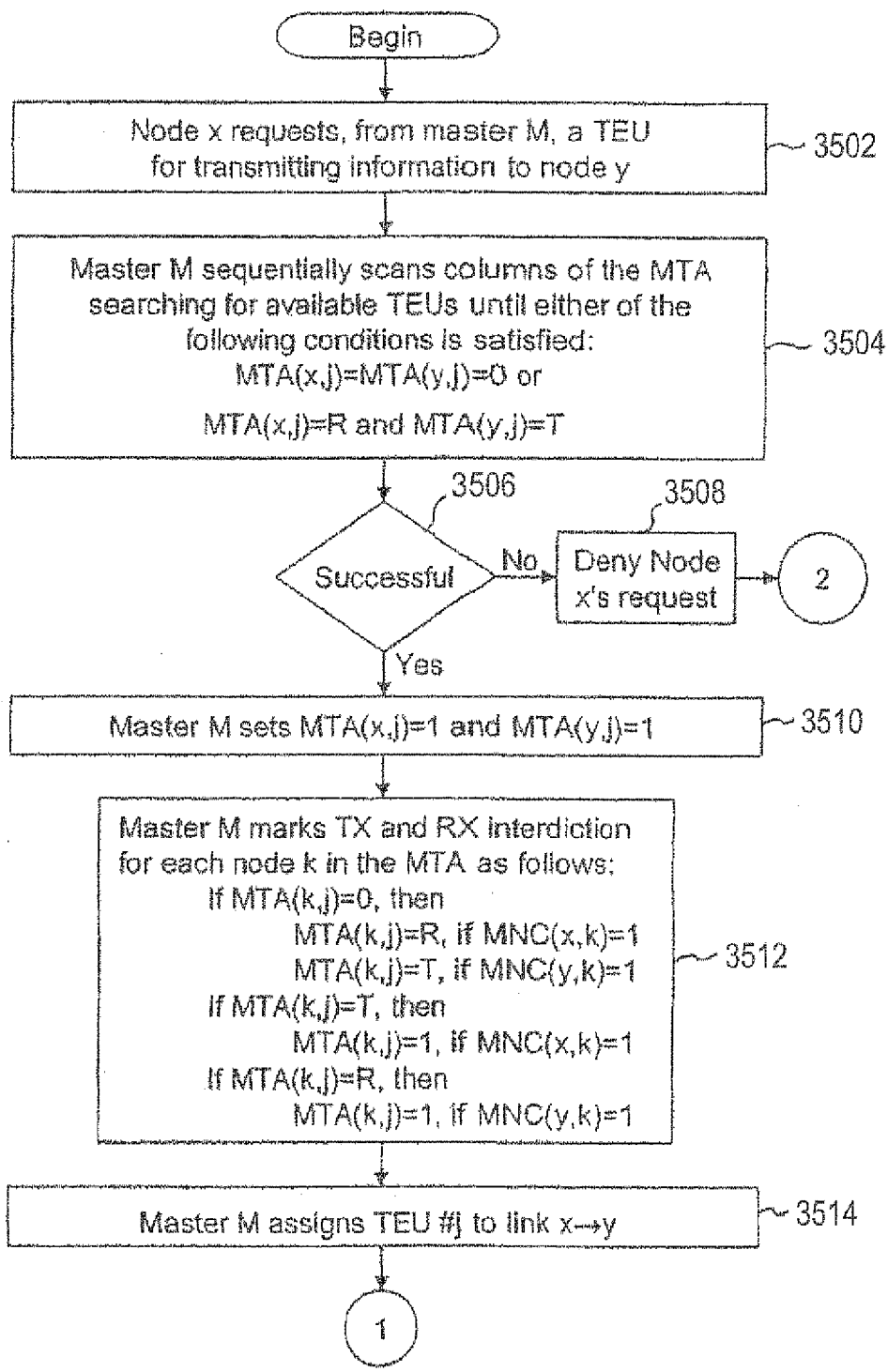
FIGS. 35(a) and 35(b) illustrate an MNC/MTA STR protocol.
Figure 35B:
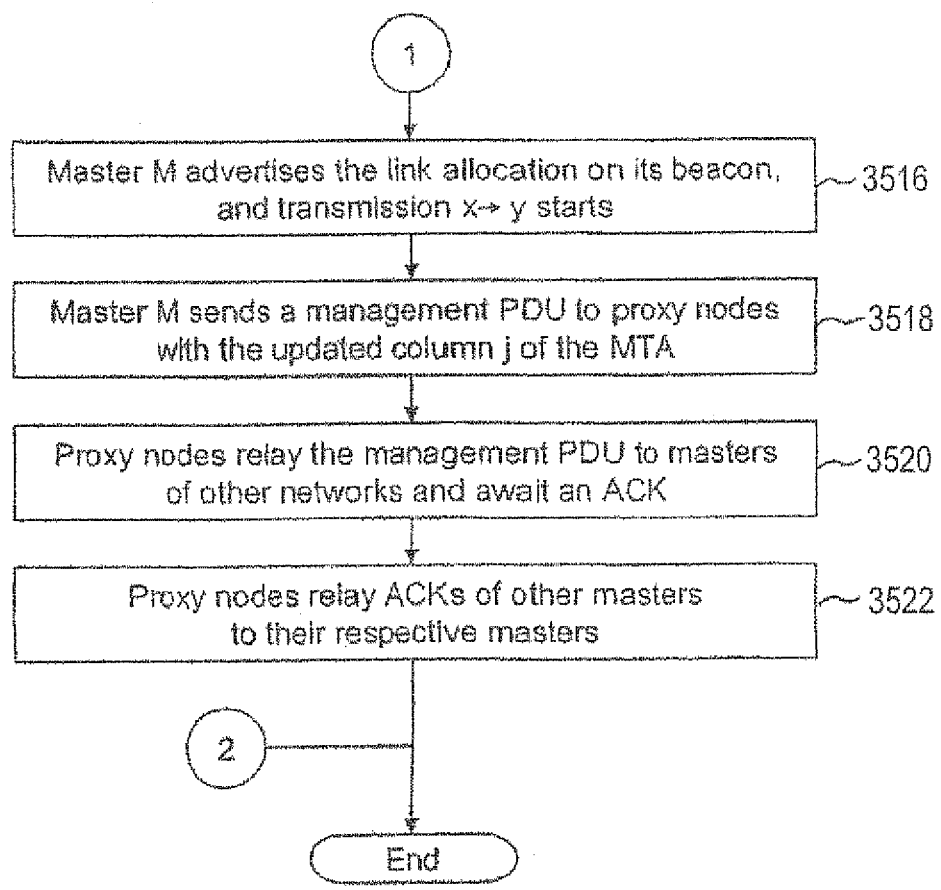

The MNC/MTA STR protocol includes the following operations, as illustrated in FIGS. 35(a) and 35(b) (this will be explained in detail below with reference to FIG. 11):

1. a node x requests from its master a TEU to transmit to y (step 3502);
2. master M sequentially scans columns of the MTA searching for available TEUs until either of the following conditions is satisfied:
ti $MTA(x,j)=MTA(y,j)=0$ or $MTA(x,j)=R$ and $MTA(y,j)=T$ (step 3504);

3. if the search is successful (step 3506), M sets $MTA(x,j)=1$ and $MTA(y,j)=1$ (step 3510); otherwise, node x's request is denied (step 3508);
4. M marks TX and RX interdiction for each node k in the MTA as follows:

If $MTA(k,j)=0$, then $MTA(k,j)=R$, if $MNC(x,k)=1$ $MTA(k,j)=T$, if $MNC(y,k)=1$ If $MTA(k,j)=T$, then $MTA(k,j)=1$, if $MNC(x,k)=1$ If $MTA(k,j)=R$, then $MTA(k,j)=1$, if $MNC(y,k)=1$ (step 3512);

5. master M assigns TEU #j to link x→y (step 3514);
6. M advertises the link allocation on its beacon, and transmission x→y starts (step 3516);
7. M sends a management PDU to proxy nodes with the updated column j of the MTA (step 3518);
8. proxy nodes relay the management PDU to masters of other networks and await an ACK (step 3520); and
9. proxy nodes relay ACKs of other masters to their respective masters (step 3522).

Consider the system in FIG. 11, which shows two AS and their MNC. Assume that the MNC is already known, S=4, MTA is quaternary, and only steps 1-5 above will be considered. Initially, no TDMA links are active, i.e., MTA(i,j)=0 for every i and j. FIG. 14(a) illustrates the MTA, upon the completion of step 3 of the quaternary STR protocol, when node x requests 2 TEUs for the link x→z in the system illustrated by FIG. 11. FIG. 14(b) illustrates the MTA of FIG. 14(a) upon the completion of step 4 of the quaternary STR protocol.

Now, node a requests 1 TEU for link a→b. FIG. 15(a) illustrates the MTA, upon the completion of step 3 of the quaternary STR protocol, when node a requests 1 TEU for link a→b in the system having the MTA illustrated by FIG. 14(b). FIG. 15(b) illustrates the MTA of FIG. 15(a) upon the completion of step 4 of the quaternary STR protocol. Space/time reuse is achieved in this example because two links are simultaneously active on the same TDM slot #1.

Now, node d requests 1 TEU for the link d→c. FIG. 16(a) illustrates the MTA, upon the completion of step 3 of the quaternary STR protocol, when node d requests 1 TEU for link d→c in the system having the MTA illustrated by FIG. 15(b). FIG. 16(b) illustrates the MTA of FIG. 16(a) upon the completion of step 4 of the quaternary STR protocol. Space/time reuse is further achieved because three links are now simultaneously active on the same TDM slot #1.

Now, node M1 requests 2 TEUs for the link M1→w. FIG. 17(a) illustrates the MTA, upon the completion of step 3 of the quaternary STR protocol, when master M1 allocates 1 TEU for link M1→w in the system having the MTA illustrated by FIG. 16(b). FIG. 17(b) illustrates the MTA of FIG.

17(*a*) upon the completion of step 4 of the quaternary STR protocol. No further space/time reuse is achieved because only three links are simultaneously active on the same TDM slot #1.

As the space/time reuse example above shows, 4 active links simultaneously using 6 TEUs, when there are only S=4 TEUs available, provide an average increase in overall throughput of 50%.

Figure 33:
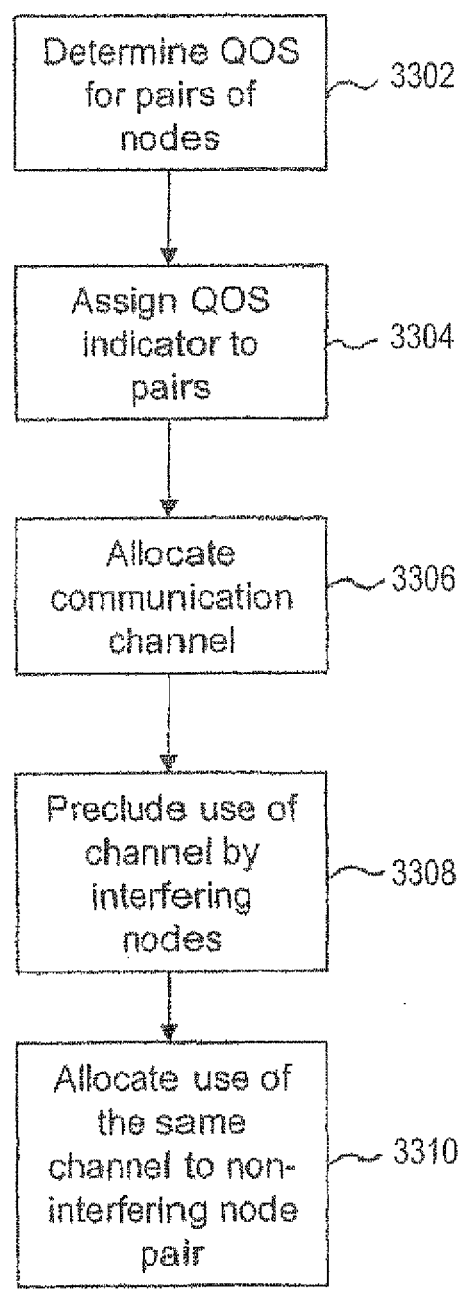
FIG. 33 illustrates a method of achieving STR by employing MNC/MTA.

FIG. 33 illustrates a method of achieving STR through the use of the MNC and MTA. A network node, such as a master node, determines 3202 the QoS for node pairs in its network or both its network and neighboring networks. Based on the QoS information for the node pairs, the master node assigns 3304 link qualifiers to the node pairs. The master allocates 3306 a channel to a node pair upon request, but precludes 3308 other node pairs that may interfere with the allocated channel from accessing the channel. Additionally, the master may allocate 3310 the channel to a non-interfering node.

Figure 38A:
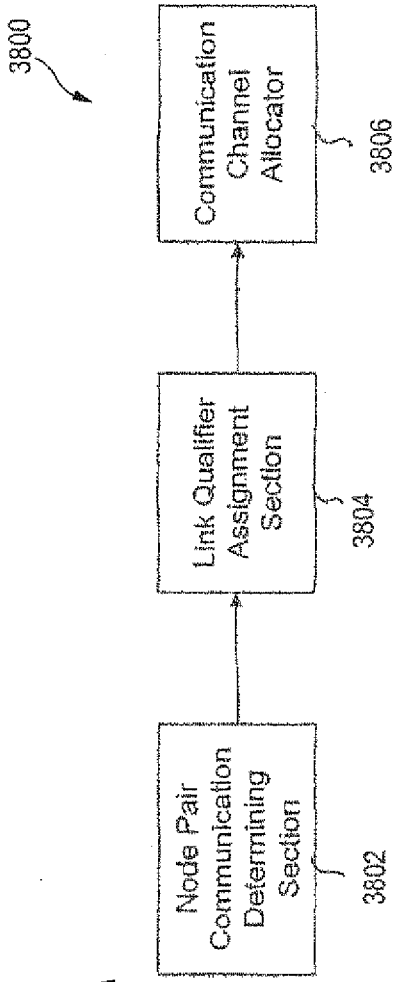
FIG. 38(a) illustrates an STR apparatus for allocating a communication channel.
Figure 38B:
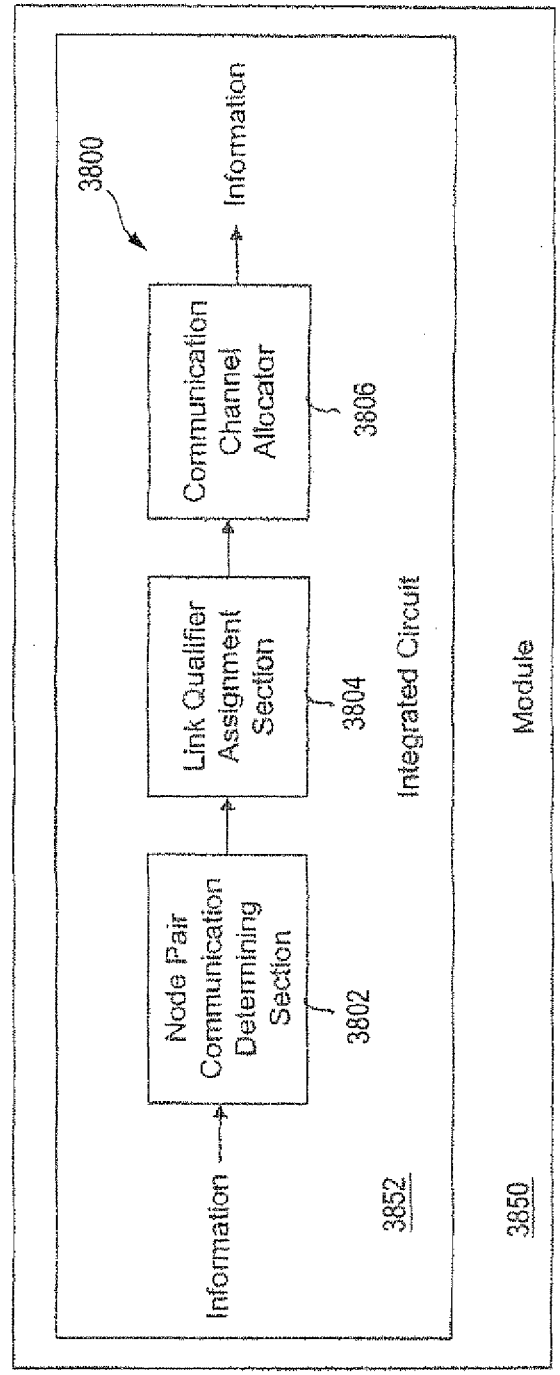
FIG. 38(b) illustrates an STR integrated circuit module having an integrated circuit that includes the STR apparatus of FIG. 38(a)

FIG. 38(*a*) illustrates an STR apparatus 3800 for allocating a communication channel. STR apparatus 3800 includes a node pair communication determining section 3802 that determines, for each of a plurality of node pairs within a network, whether the pair of nodes may communicate at a particular QoS. A link qualifier assignment section 3804 assigns a first link qualifier to each pair of nodes that is determined to be able to communicate at the particular QoS and, otherwise, assigns a second link qualifier to each pair of nodes. A communication channel allocator 3806 allocates, for a pair of first and second network nodes that has the first link qualifier assigned thereto, a communication channel for communication of payload information from the first node to the second node. Communication channel allocator 3806 partially or fully precludes another network node from concurrently being allocated the channel if either the pair of the other node and the first node or the pair of the other node and the second node is assigned the first link qualifier.

FIG. 38(*b*) illustrates an STR integrated circuit module 3850. STR integrated circuit module 3850 has an integrated circuit 3852 that includes STR apparatus 3800.

Space/Time Reuse Protocol for Heterogeneous Networks

Heterogeneous networks are networks having non-interoperable devices, such as when not all devices have the same PHY (modulation, coding, bandwidth, etc.). For example, this is the case where one AS contains devices that use PHY-A and a second AS contains devices that use a PHY-B different from PHY-A. In this case, communication between the devices in AS(A) that use PHY-A and the devices in AS(B) that use PHY-B is impossible using their native communication protocols. Each AS can still use the STR protocol described above, but information can be exchanged only among the ASs that are homogenous, i.e., have interoperable nodes. The present embodiment provides a technique for increasing STR gains by providing a protocol for the devices to be somewhat interoperable.

This embodiment provides two techniques for providing limited interoperability between devices in an heterogeneous network: a simple common signaling scheme (S-CSS) and an enhanced common signaling scheme (E-CSS). S-CSS devices are equipped with a simple common signaling scheme, in addition to their native communications protocol, that, while not allowing them to exchange data packets, nevertheless enables them to exchange very basic information, such as information of their presence/absence in the network of an AS with a certain PHY or bandwidth requirements of a certain set of ASs that have the same PHY; this basic information is then exploited by the STR protocol. E-CSS devices are equipped with a common signaling scheme, in addition to their native communications protocol, that is more sophisticated than the S-CSS signaling scheme and that enables exchange of packets containing data useful to the STR protocol.

If devices are equipped with a simple signaling scheme, it is still be possible to use an STR protocol based on power control, as described above. Although it may not be possible to exchange requests for modifying interference footprints between two heterogeneous ASs, the information conveyed via the basic common signaling scheme is exploited to modify the interference footprint generated by each AS.

The use of the more sophisticated common signaling scheme that allows the exchange of data packets enables heterogeneous nodes to use matrix based MNC/MTA STR protocols. The use of E-CSS supports the above-described STR protocols, described with respect to homogeneous networks, with some modifications.

Simple Common Signaling Scheme (S-CSS)

Assume that all PLC devices on a network have, in addition to their native signaling scheme, the capability of generating a simple multicarrier waveform in accordance with a simple signaling scheme (CSS). This is accomplished by storing in memory samples of the waveform and providing the samples from the memory directly to a digital to analog (D/A) converter. This method can be implemented even in a device that does not have a native multicarrier signaling scheme. Assume the multicarrier waveform is designated "S-CSS" and that P different S-CSSs exist, where P is the number of different native signaling schemes.

Every device that has a certain PHY transmits the S-CSS simultaneously and periodically. Every system that has a certain PHY transmits the S-CSS in a round robin fashion at fixed offsets from the zero crossing of the AC mains.

Figure 18:
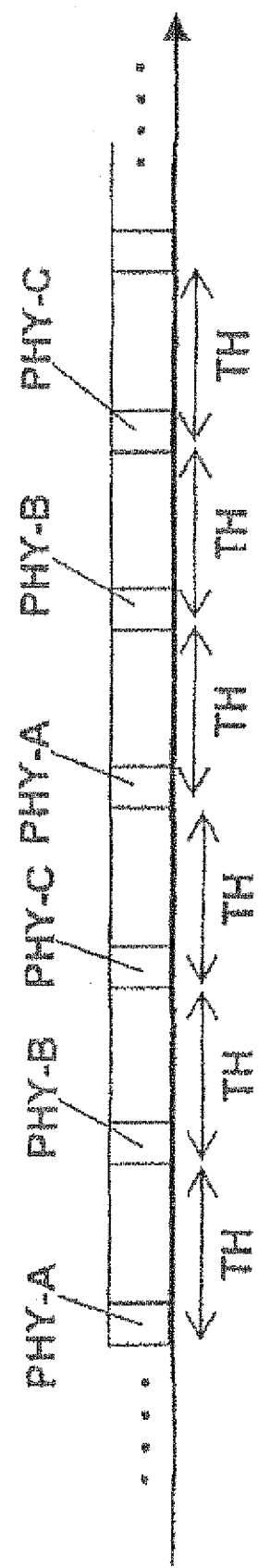
FIG. 18 illustrates an example in which the devices of three systems having different native signaling schemes, PHY-A, PHY-B, and PHY-C, transmit respective S-CSSs.

FIG. 18 illustrates an example in which the devices of three systems having different native signaling schemes, PHY-A, PHY-B, and PHY-C, transmit their S-CSSs. All devices that have PHY-A transmit S-CSS(A) every P=3 synchronization periods TH. Similarly, all devices that have PHY-B transmit S-CSS(B) every P=3 synchronization periods TH with an offset of TH from when S-CSS(A) was transmitted. Similarly, all devices that have PHY-C transmit S-CSS(C) every P=3 synchronization periods TH with an offset of 2·TH from when S-CSS(A) was transmitted and an offset of TH from when S-CSS(B) was transmitted.

In this CSS scheme, because all nodes of a certain PHY transmit same information at the same time using a baseband multicarrier waveform, the superposition of the signals may be detected by other nodes. Nodes detect the network status, i.e., the number of systems with different native signaling schemes that are on the network, by detecting which S-CSS waveforms are transmitted. FIG. 19(*a*) illustrates the detection of three S-CSS waveforms indicating the existence of three different native signaling schemes.

Each S-CSS signal is transmitted at a fixed offset from an AC zero crossing. Windows of transmission opportunity are defined, and systems transmit in those windows to signal their presence on the network. If there are no devices of a certain PHY, then no transmission would occur in the corresponding window of transmission opportunity. FIG. 19(*b*) illustrates an example in which only two of three S-CSS waveforms are detected.

Figure 20:
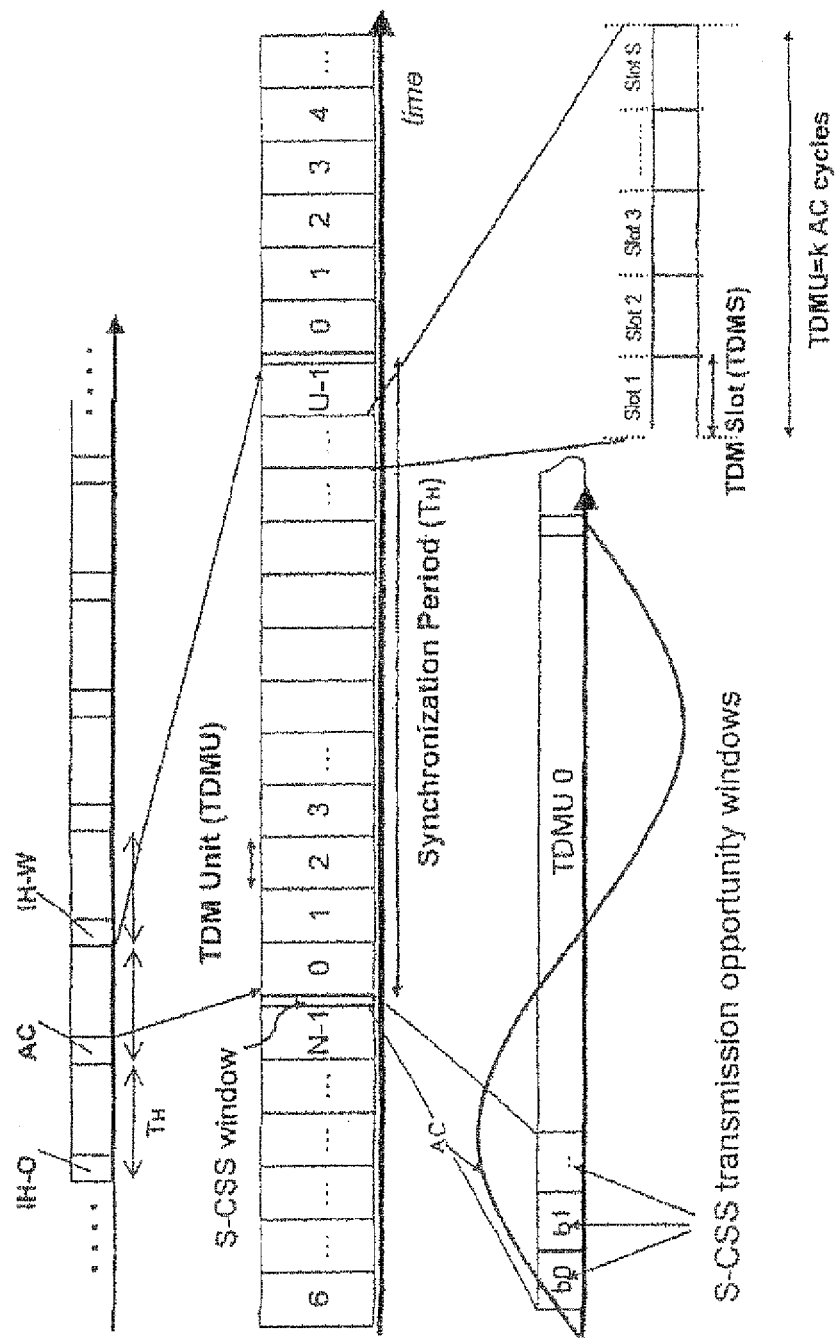
FIG. 20 illustrates an embodiment in which the time between consecutive S-CSS transmissions is further subdivided into U TDM units (TDMUs) and each TDMU is subdivided in STDM slots (TDMS)

The period TH of identical S-CSS transmissions, in one embodiment, is an integer multiple of the AC mains cycle. FIG. 20 illustrates an embodiment in which the time between consecutive S-CSS transmissions is further subdivided into U TDM units (TDMUs) and each TDMU is subdivided in S TDM slots (TDMSs). The values of U and S are chosen based on certain factors. U governs the frequency (or latency) of network status update. S governs the tradeoff between bandwidth granularity and the minimum latency experienced by packets of an AS. Exemplary values of U and S are in the range $3 \leq U \leq 10$ and S should be an integer multiple of P. However, the choice of these values depends on the application.

The knowledge of the network status is used to determine how resources will be shared on the basis of pre-set policies. The fundamental concept is that network status is associated with a certain TDMA structure within the TDMU. Although this invention is general and is independent of those policies, for the sake of clarity, the examples herein assume a specific policy and a maximum number of different native PHYs equal to P=3. In practice, the devices present on the market and the status of standardization are taken into account to generate optimized values for P, S, and U, as well as the pre-set policies. Without loss of generality, assume in the following examples the following policy is enforced. If all three PHYs are present: (1) PHY-A devices are entitled to use up to 50% of the resources, (2) PHY-B devices are entitled to use up to 25% of the resources, and (3) PHY-C devices are entitled to use up to 25% of the resources. If only two PHYs are present, each system is entitled to use up to 50% of the resources. Each system may use less resources if their QoS constraints allow it. Also, a system may use more or less resources than those indicated above if another system relinquishes its resources. This feature is denominated as dynamic bandwidth assignment (DBA).

Systems use the S-CSS signals to advertise their request for resources to all other devices. For example, multiple S-CSS windows of transmission opportunity are shown in FIG. 20. The first window for transmission opportunity, field b0, advertises that a system is present; the second window for transmission opportunity, field b1, advertises the resource requirements. If S-CSS(A) is present in field b1, it means that a PHY-A device wants all the resources available to it (i.e., the policy entitlement); if S-CSS(A) is not present in field b1, then it means that the PHY-A device can give up some resources for the benefit of other systems. Other transmission opportunity windows may also be present and allow several features, for example, more bandwidth granularity in implementing DBA, re-synchronization of systems, and a request for frequency division multiplexing (FDM) resource sharing. The presence of fields bx (x=1, 2, 3 . . . ) is not necessary, but allows better resource sharing among the multiple systems on the power line channel.

Figure 21:
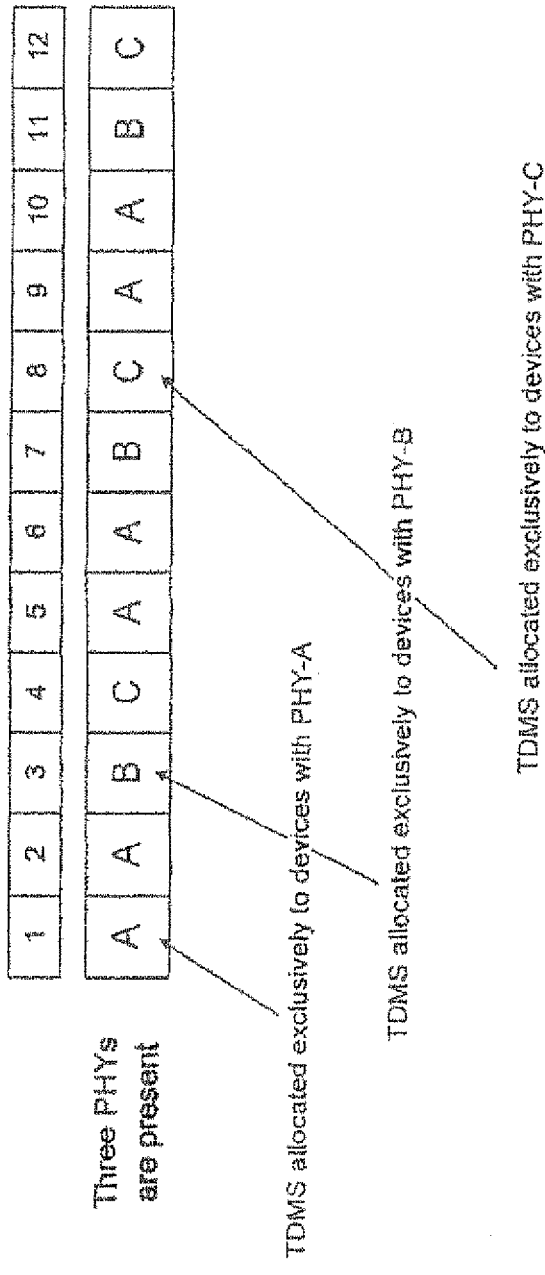
FIG. 21 illustrates a time division multiple access (TDMA) structure having S=12 time slots.

As an example of how network status is associated with a particular TDMA structure, assume that nodes in the network detect the S-CSS waveforms of all three PHYs, as in FIG. 19(a). FIG. 21 illustrates a TDMA structure that satisfies the policies given above for the case of S=12.

As another example of how network status is associated with a particular TDMA structure, assume that nodes in the network detect the S-CSS waveforms of only PHY-A and PHY-C, as illustrated in FIG. 19(b). FIG. 22 illustrates two TDMA structures that satisfy the policies given above for the case of S=12. The two solutions differ in terms of the minimum latency that can be ensured to a system.

In both examples, systems are assigned interleaved TDMSs to minimize latency. Alternatively, a chunk of contiguous TDMSs are assigned. This solution simplifies implementation but does not minimize latency. Again, the appropriate choice is made on the basis of QoS constraints and depends on a case-by-case basis.

FIGS. 23-25 illustrate TDMA structures for S=12 and P=3 when two S-CSS transmission opportunity windows, fields b0 and b1, are used to advertise resource requirements. In this particular example, two TDMS slots are introduced at the beginning of every TDMU that can be used by all systems in the CSMA.

With respect to the specific TDMA structures that are available for use, it is required that all the available TDMA structures and their association to the network status are known to all devices on the network. In one embodiment, these TDMA structures are pre-set in memory. Although practicality puts a constraint on the number of available TDMA structures that can be stored in memory, the present invention can work with any number of pre-set TDMA structures.

The S-CSS protocol can also operate using power control as follows. Not all nodes transmit their interrupted Poisson process (IPP) waveform simultaneously; instead, only nodes that plan to transmit data at the next synchronization period simultaneously transmit the IPP. If a node does not plan to send data, it will not transmit the IPP waveform. Also, the node need not transmit the IPP waveform when it is sufficient to transmit in D1 and D2 using CSMA. After estimating the minimum necessary power to establish a desired link, a node transmits the IPP waveform at that power, not at the maximum power. This has an effect of reducing the interference footprint of that node.

STR Protocol for Heterogeneous Networks Based on S-CSS

The following STR protocol is designed for heterogeneous networks and exploits the availability of an S-CSS and a set of known TDMA structures unequivocally associated with the network status. As described previously, every node that shares a common native PRY transmits the S-CSS simultaneously, periodically or occasionally, and in a round robin fashion with the other systems (see FIGS. 18 and 19).

Figure 26:
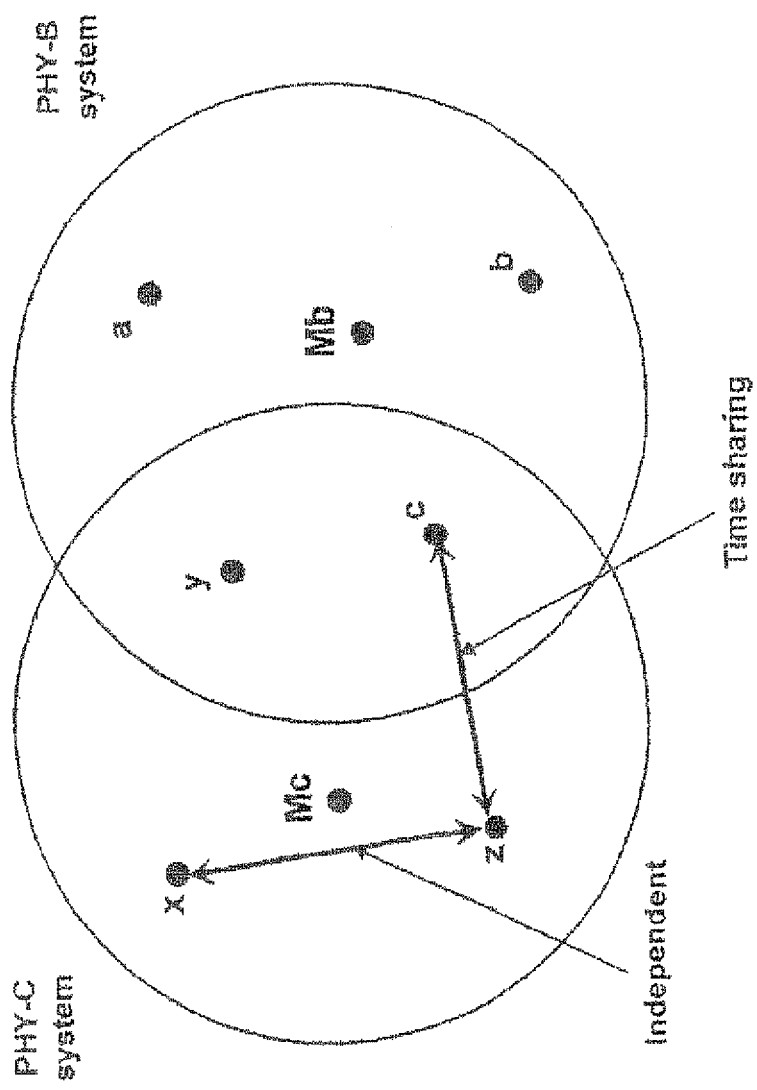
FIG. 26 illustrates two heterogeneous systems using time sharing to orthogonalize their communications.

Every node of a system transmits in field b0 and some also transmit in field b1 according to their respective resource requirements. Each node of a system detects the superposition of the S-CSSs of the nodes of the other systems. Based on this detection, each node decides whether it can transmit/receive signals at the same time as another PHY system (independent node that can achieve STR gain) or if it has to orthogonalize its operation by using another TDMS (i.e., time sharing case). FIG. 26 illustrates two heterogeneous systems using time sharing to orthogonalize their communications.

Each node autonomously builds an interference index vector (IIV). When communicated to their respective master nodes, the set of all IIVs of a system form a co-existence PHY list (CPL). The IIV indicates whether a node in one system can detect the S-CSS from other systems that use a different PHY. FIG. 27(a) illustrates how three systems with three different PHYs can interfere with each other.

FIG. 27(b) illustrates a CPL generated by the nodes of the system using PHY-C. The CPL illustrated in FIG. 27(b) indicates that master Mc detects field b0 of S-CSS(B) but not field b1, which means one or more PHY-B system nodes can interfere with master Mc communications and that the PHY-B nodes detected by master Mc are not requesting their maximum available resources. Node x does not detect the presence of any node with a different PHY. Node y detects fields b0 and b1 of S-CSS(B) and S-CSS(A), indicating that there are one or more PHY-B system nodes and one or more PHY-A system nodes that may interfere with node y communications and the one or more nodes of each of these systems are requesting the maximum available resources. Node z detects fields b0 and b1 of S-CSS(A), indicating that one or more PHY-A system nodes can interfere with node z communications and that one or more PHY-A nodes detected by node z are requesting their maximum available resources. All nodes in the system using PHY-C transmit their presence and their request for maximum resources, except node y which signals it may accept reduced resources.

As shown in FIGS. 23-25, every IIV is associated with a TDMA structure. For example, IIV(x){B,C,A}="00 11 00" corresponds to pattern 6, and IIV(z){B,C,A}="00 11 11" corresponds to pattern 4. If node x wished to communicate with node z it would immediately know what TDMSs to use by computing a usable slot table (UST). FIG. 27(c) illustrates a UST for the CPL of FIG. 27(b). Each slot of the UST contains a 1 when the TDMA structure of sender and receiver have common TDMS values, and 0 otherwise. The link x→z is then established using the TDMSs marked with a "1" in the UST. For example, link x→z may communicate information in TDMSs 3, 4, 7, 8, 11, 12, because the values of UST slots 3, 4, 7, 8, 11, 12 are all 1.

Description of Heterogeneous STR Protocol

The STR protocol for heterogeneous PHYs has the following steps, which are illustrated in FIG. 36.

1. startup,
   start-up, synchronization with S-CSS period, etc. (step 3602);
2. each node transmits S-CSS in accordance with resource requirements (step 3604);
3. each node detects S-CSS of other systems and sets IIV as follows:
   1, if received signal is strong, i.e., larger than threshold, and
   0, if received signal is weak, i.e., smaller than threshold (step 3606);
4. each node chooses the TDMA structure corresponding to its IIV and each node will be able to transmit only in the dedicated TDMSs assigned to its system (step 3608);
5. each node communicates its IIV to the master node, and the master updates the CPL (step 3610);
6. each master node advertises its CPL to all the nodes in its system, e.g., using a beacon (step 3612); and
7. every node creates the UST and, when it wishes to communicate with another node, uses the TDMSs marked by a "1" in the UST (step 3614).

Figure 40:
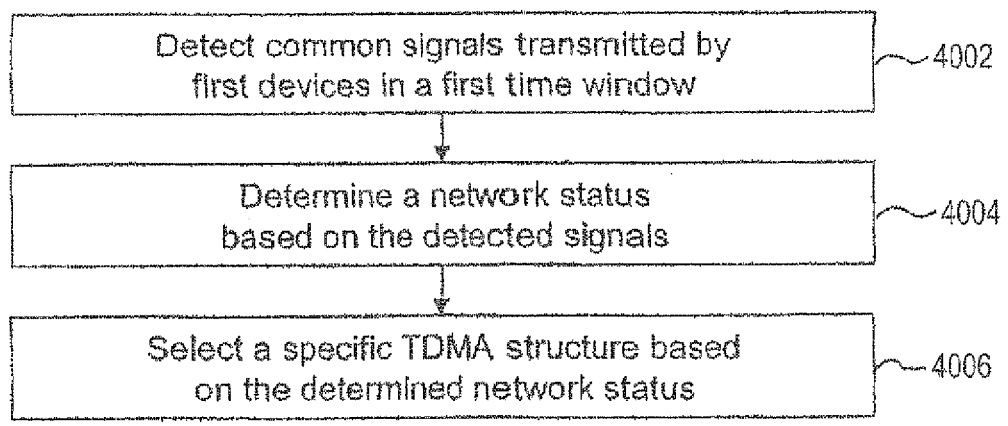
FIG. 40 illustrates an STR protocol for heterogeneous PHYs.

FIG. 40 illustrates the novel STR algorithm more generically. As illustrated in FIG. 40, each node detects (step 4002) a common signal transmitted by other nodes. Each node determines (step 4004) a network status based on the detected signals, and selects (step 4006) a specific TDMA structure based on the determined network status.

Figure 28A:
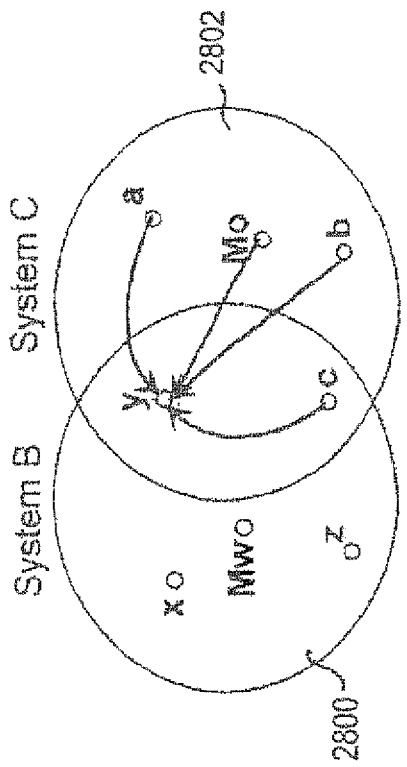
FIGS. 28(a) and 28(b) illustrate two ASs, one using PHY-B and the other one using PHY-C.
Figure 28B:
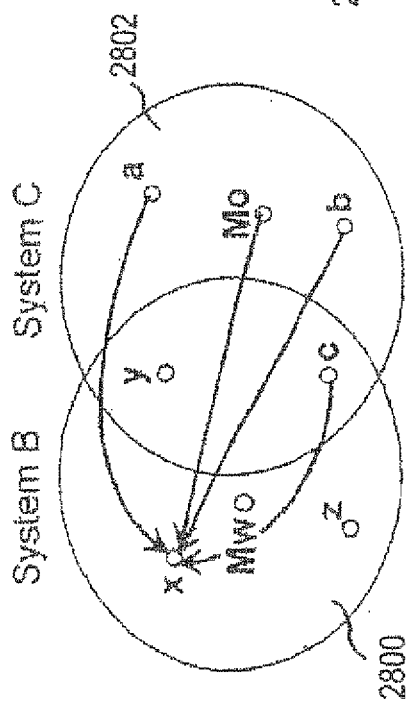

FIGS. 28(a) and 28(b) illustrate two ASs, one using PHY-B and the other one using PHY-C. Each system has 4 nodes, one master and three slaves. All nodes in system B 2800 transmit an IPP signal {b0,b1}={1,0}. For nodes in system C 2802, nodes a, b, and c transmit {b0,b1}={1,0} and Mo transmits {1,1}. Nodes in system B 2800 receive the IPP signals and create their IIV={B,C,A}. Assume that for: (1) nodes x and z, IIV={10,00,00} (all signals from system C 2802 are weak)→pattern 5, as illustrated in FIGS. 23 and 28(a), and (2) for master Mw and node y, IIV={10,11,00} (there are strong IPP signals from system C 2802)→pattern 17, as illustrated in FIGS. 25 and 28(b).

FIG. 29(a) illustrates, for the heterogeneous systems of FIGS. 28(a) and 28(b), that each node in system B 2800 reports its IIV to master Mw. FIG. 29(b) illustrates the CPL generated by master Mw based on the IIVs received from nodes x, y, and z. FIG. 29(c) illustrates master Mw broadcasting the generated CPL to nodes x, y, and z through a signal, such as its beacon. FIG. 29(d) illustrates the TDM patterns selected in accordance with the IIVs of nodes Mw, x, y, and z.

FIGS. 30(a) and 30(b) illustrate the heterogeneous systems of FIG. 28 in which nodes x, y, and z transmit IPP{b0,b1}={1,0}, master Mw transmits {1,1}, and the nodes in system C 2802 create their IIVs={B,C,A} from the received IPPs. Assume that master Mo's IIV={10,11,00}, node a's and node c's IIVs={10,10,00}, and node b's IIV={00,10,00}. Each node in system C 2802 reports its IIV to master Mo. FIG. 30(c) illustrates the CPL generated by master Mo based on the IIVs received from nodes a, b, and c. FIG. 30(d) illustrates the TDM patterns selected in accordance with the IIVs of nodes Mo, a, b, and c. Specifically, pattern 6 is selected for node b, pattern 2 is selected for nodes a and c, and pattern 17 is selected for master Mo.

FIG. 31(a) illustrates the heterogeneous systems of FIG. 28(a) in which a link x↔z 3100 and a link a↔b 3102 are established. FIG. 31(b) illustrates the TDM patterns selected by nodes x and z for communication. Because nodes x and z employ the same TDM pattern and this pattern allocates all time slots to system B 2800 communication, nodes x and z may communicate in all TDM slots. FIG. 31(c) illustrates the TDM patterns selected by nodes a and b for communication. Because the TDMs of nodes a and b share common resources (i.e., system C 2802 resources) in slots 4, 5, 8, 9, and 12, nodes a and b may communicate in TDM slots 4, 5, 8, 9, and 12.

FIG. 31(d) illustrates the heterogeneous systems of FIG. 28(a) in which a link x↔y 3104 and a link a↔e 3106 are established. FIG. 31(e) illustrates the TDM patterns selected by nodes x and y for communication. Because the TDMs of nodes x and y share common resources (i.e., system B 2800 resources) in slots 3, 7, 10, and 11, nodes x and y may communicate in TDM slots 3, 7, 10, and 11. FIG. 31(f) illustrates the TDM patterns selected by nodes a and c for communication. Because the TDMs of nodes a and c share common resources (i.e., system C 2802 resources) in slots 4, 5, 8, 9, and 12, nodes a and c may communicate in TDM slots 4, 5, 8, 9, and 12.

Even though links x↔z 3100 and a↔b 3102 communicate information simultaneously, the IIVs of nodes x and z indicate that these nodes do not receive significant interference from nodes a and b, and vice versa. Thus, space orthogonality of communication resources common to systems B 2800 and C 2802 and an STR gain of 50% is achieved for the links illustrated in FIG. 31(a).

And even though each of links x↔y 3104 and a↔c 3106 may create significant interference for the other, as illustrated in FIG. 31(d), FIGS. 31(e) and (f) illustrate how time orthogonality of communication resources common to systems B 2800 and C 2802 is achieved for the links illustrated in FIG. 31(d). More specifically, link x↔y 3104 communicates in TDM slots 3, 7, 10, and 11 and link a↔c 3106 communicates in TDM slots 4, 5, 8, 9, and 12.

Figure 34:
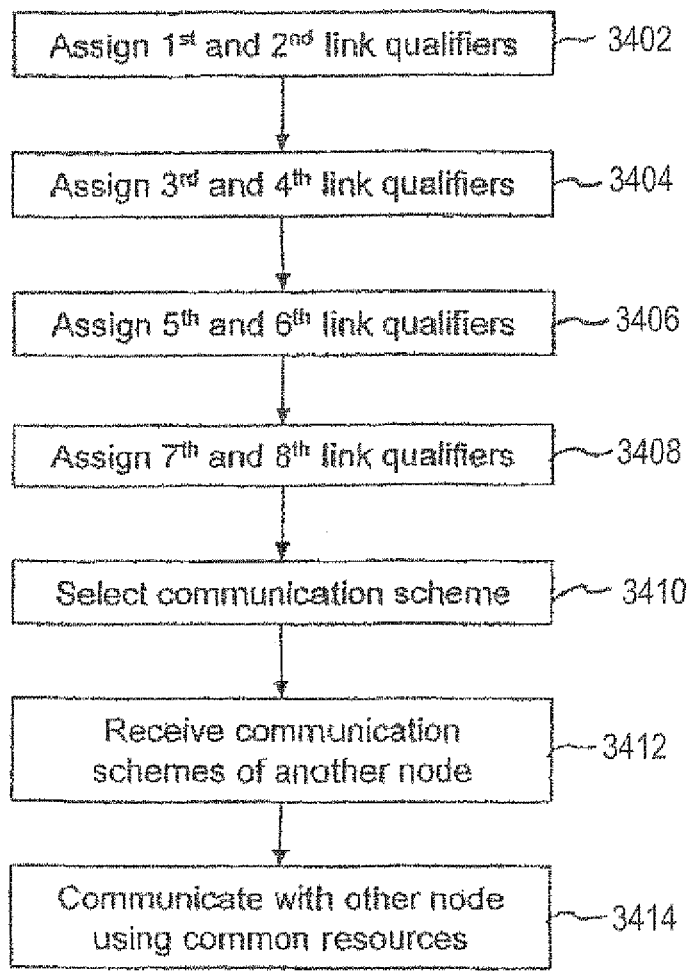
FIG. 34 illustrates a method of achieving STR in heterogeneous networks.

FIG. 34 illustrates a method of achieving STR with heterogeneous networks. According to this method, a network node assigns 3402 a first link qualifier to a first network if a first signal is received during a first time period with a particular QoS and, otherwise, assigns 3402 a second link qualifier. A third link qualifier is assigned 3404 to the first network if the first signal is received during a second time period and, otherwise, a fourth link qualifier is assigned 3404. A fifth link qualifier is assigned 3406 to a second network if a second signal is received during a third period with the particular QoS and, otherwise, a sixth link qualifier is assigned 3406. A seventh link qualifier is assigned 3408 to the second network if the second signal is received during a fourth time period and, otherwise, an eighth link qualifier is assigned 3408. One of a plurality of orthogonal communication resource schemes is selected 3410 according to the first through eighth link qualifiers assigned to the first and second networks and used for communicating with another network node. The first, second, third, and fourth time periods are non-overlapping periods. The network node receives 3412 an orthogonal communication resource scheme from the other network node and communicates 3414 information to the other network node only with resources that are common to the selected and received orthogonal communication resource schemes.

Figure 39A:
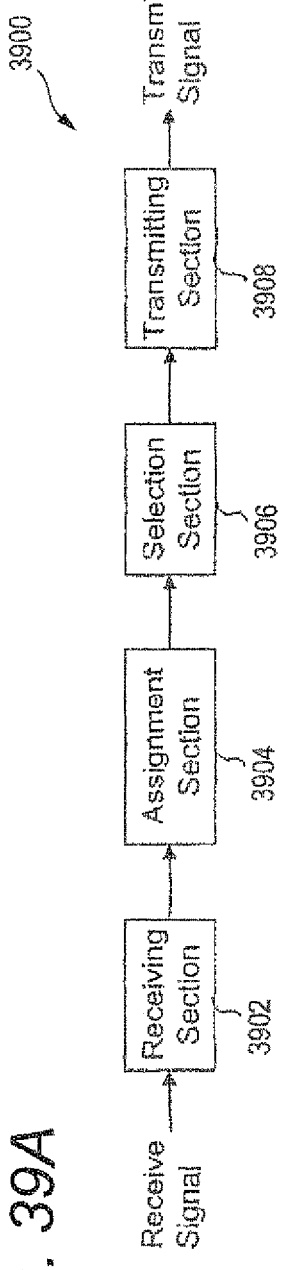
FIG. 39(a) illustrates an STR apparatus that allocates a communication channel to a network node.

FIG. 39(a) illustrates an STR apparatus 3900 that allocates a communication channel to a network node. STR apparatus includes a receiving section 3902 that receives communicated signals. An assignment section 3904: (1) assigns a first link qualifier to a first network if a first signal is received during a first time period with a particular QoS, and assigns a second link qualifier to the first network if the first signal is so received without the particular QoS; (2) assigns a third link qualifier to the first network if the first signal is received during a second time period, and assigns a fourth link qualifier to the first network if the first signal is so received without the particular QoS; (3) assigns a fifth link qualifier to a second network if a second signal is received during a third time period with the particular QoS, and assigns a sixth link qualifier to the second network if the second signal is so received without the particular QoS; and (4) assigns a seventh link qualifier to the second network if the second signal is received during a fourth time period, and assigns an eighth link qualifier to the second network if the second signal is so received without the particular QoS. The first, second, third, and fourth time periods are non-overlapping periods. A selection section 3906 selects one of a plurality of orthogonal communication resource schemes according to the first through eighth link qualifiers assigned to the first and second networks, and a transmitting section 3908 communicates with another network node using the selected orthogonal communication resource scheme.

Figure 39B:
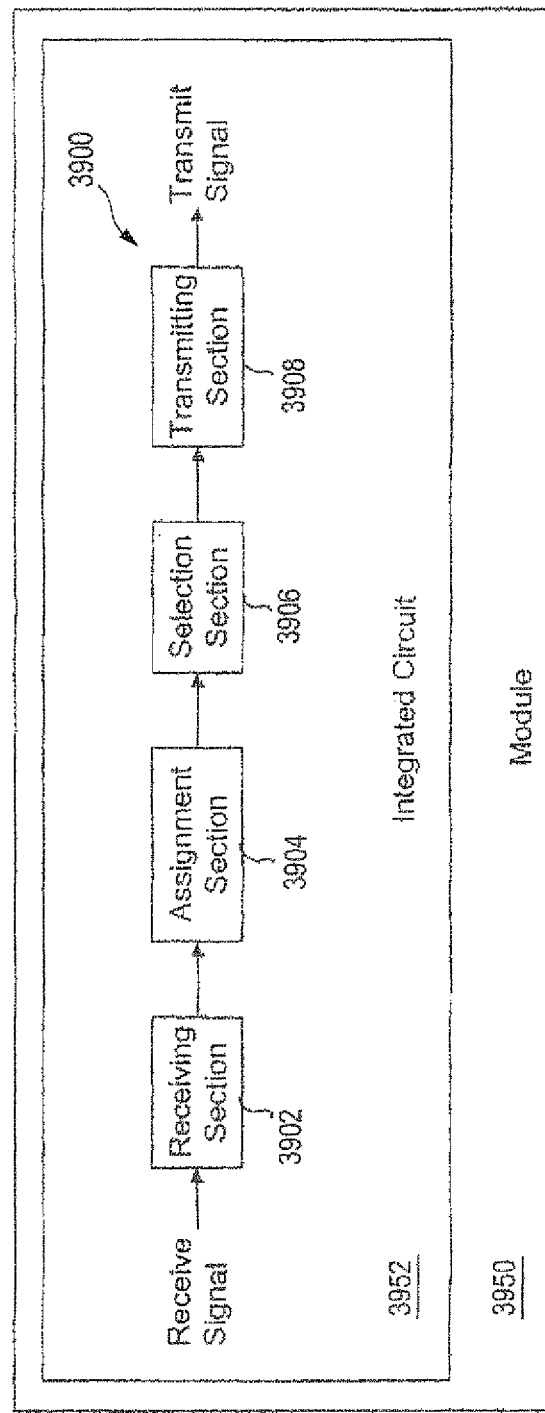
FIG. 39(b) illustrates an STR integrated circuit module having an integrated circuit that includes the STR apparatus of FIG. 39(a)

FIG. 39(b) illustrates an STR integrated circuit module 3950 that allocates a communication channel to a network node. STR integrated circuit module 3950 has an integrated circuit 3952 that includes STR apparatus 3900.

Figure 41:
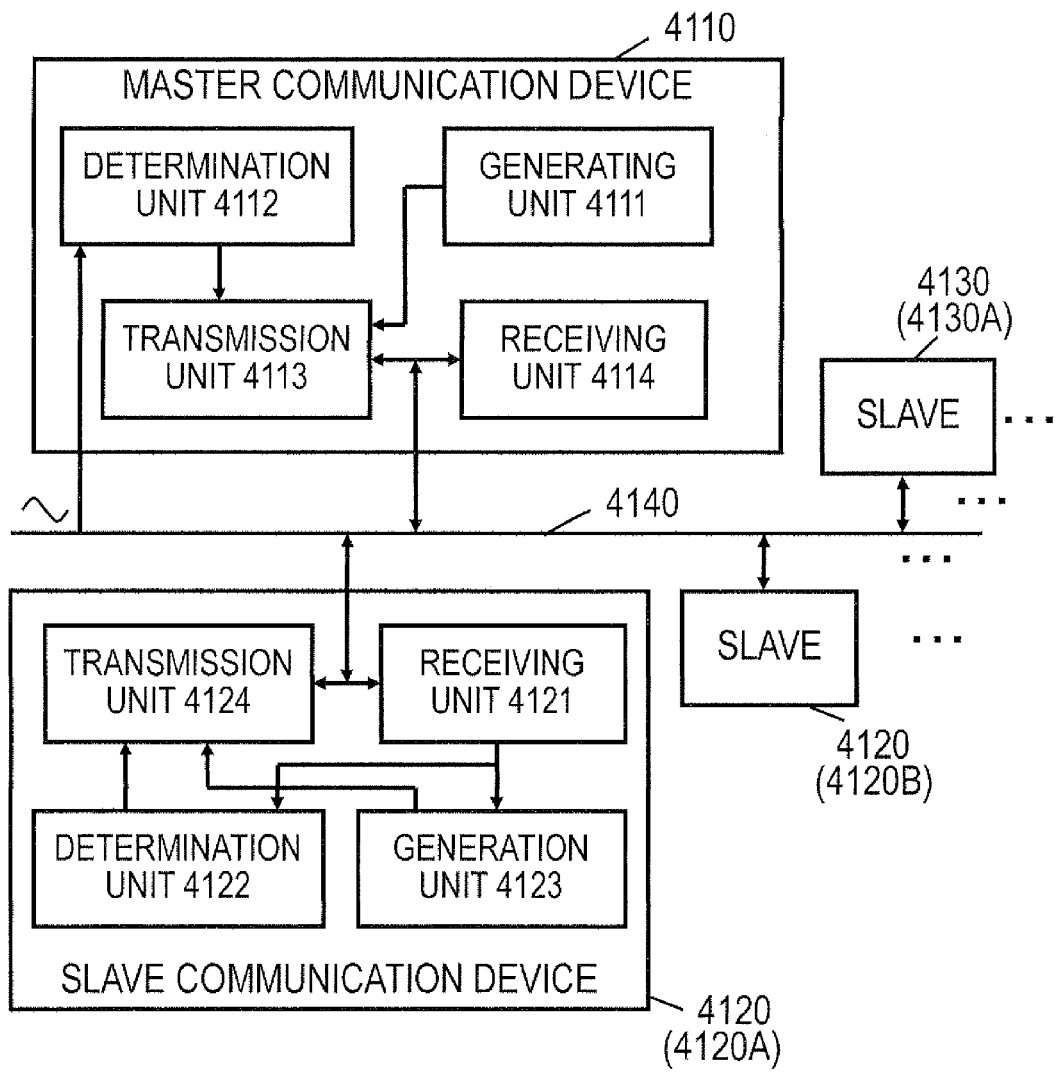
FIG. 41 is a schematic block diagram showing an example of a power line communication system including a master communication device and slave communication devices according to an aspect of the invention.

FIG. 41 is a schematic block diagram showing an example of a power line communication system including a master communication device and slave communication devices according to an aspect of the invention. The power line communication system in this aspect includes a master communication device 4110. slave communication devices 4120, 4130 and a power line 4140. The slave communication devices 4120, 4130 includes a first slave communication device 4120A, a second slave communication device 4120B and a third slave communication device 4130A, for example. The existing number of the slave communication devices 4120, 4130 is not limited, but may be more than three. The power line 4140 connects the master communication device 4110 and the slave communication devices 4120, 4130. The master communication device 4110, the first slave communication device 4120A and the second slave communication device 4120B communicate with each other using the same protocol at least. Here, the third slave communication device 4130A belongs to another communication system using a different communication protocol, which is controlled by another master communication device.

The master communication device 4110 controls a first power line communication system using a first communication protocol on the power line 4140. There is a second power line communication system using a second communication protocol which is different from the first communication protocol on the power line 4140, and the second power line communication system coexists with the first power line communication system on the power line 4140. The master communication device 4110 includes a generating unit 4111, a determination unit 4112, a transmission unit 4113 and a receiving unit 4114. The generating unit 4111 generates a first reference signal including first system information indicating a presence of the first power line communication system on the power line 4140. The determination unit 4112 determines a first offset indicating a first period which appears periodically and repeatedly, based on an AC cycle of mains on the power line 4140. The transmission unit 4113 transmits the first reference signal at the first period to the slave communication device 4120 which belongs to the first power line communication system, i.e., to the first slave communication device 4120A and the second slave communication device 4120B in this example.

As such, the first slave communication device 4120A belongs to the first power line communication system that is controlled by the master communication device 4110, using the first communication protocol, on the power line 4140. The first slave communication device 4120A includes a receiving unit 4121, a determination unit 4122, a generation unit 4123 and a transmission unit 4124. The receiving unit 4121 receives the first reference signal including the first system information indicating the presence of the first power line communication system on the power line 4140 from the master communication device 4110. The first reference signal is transmitted periodically and repeatedly, based on the AC cycle of mains on the power line 4140. The determination unit 4122 determines a first offset indicating a first period which appears periodically and repeatedly, based on the first reference signal. The generation unit 4123 generates a second reference signal including the first system information. The transmission unit 4124 transmits the second reference at the first period simultaneously with the first reference signal. The second slave communication device 4120B has the same function as the first slave communication device 4120A. The third slave communication device 4130 (4130A) has a similar function to the first slave communication device 4120A, but belongs the second power line communication system that is controlled by another master communication device, using the second communication protocol, on the power line 4140.

The foregoing description illustrates and describes the present invention. However, the disclosure shows and describes only the preferred embodiments of the invention, but it is to be understood that the invention is capable of use in various other combinations, modifications, and environments. Also, the invention is capable of change or modification, within the scope of the inventive concept, as expressed herein, that is commensurate with the above teachings and the skill or knowledge of one skilled in the relevant art. For example, one or more elements of each embodiment may be omitted or incorporated into the other embodiments.

The foregoing description of implementations and embodiments of the invention have been presented for purposes of non-limiting illustration and description. Although the present invention has been described herein with reference to particular structures, materials and embodiments, the present invention is not intended to be limited to the particular features and details disclosed herein. Rather, the present invention extends to all functionally equivalent structures, methods and uses, such as are within the scope of the appended claims. The descriptions provided herein are not exhaustive and do not limit the invention to the precise forms disclosed. The foregoing embodiment examples have been provided merely for purposes of explanation and are in no way to be construed as limiting the scope of the present invention. The words that have been used herein are words of description and illustration, rather than words of limitation. The present teachings can readily be realized and applied to other types of apparatuses. Further, modifications and variations, within the purview, scope and sprit of the appended claims and their equivalents, as presently stated and as amended hereafter, are possible in light of the above teachings or may be acquired from practicing the invention. Furthermore, although elements of the invention may be described or claimed in the singular, the plural is contemplated unless limitation to the singular is explicitly stated Alternative structures discussed for the purpose of highlighting the invention's advantages do not constitute prior art unless expressly so identified. No one or more features of the present invention are necessary or critical unless otherwise specified.

What is claimed is:

1. A master communication device that controls a first power line communication system using a first communication protocol on a power line on which a second power line communication system using a second communication protocol coexists, wherein the first communication protocol is different from the second communication protocol, the master communication device comprising:
    a generating unit configured to generate a first reference signal including first system information indicating a presence of the first power line communication system on the power line;
    a determination unit configured to determine a first offset indicating a first period which appears periodically and repeatedly, based on an AC cycle of mains on the power line; and
    a transmission unit configured to transmit the first reference signal at the first period to a slave device which belongs to the first power line communication system.

2. The master communication device according to claim 1, further comprising:
    a receiving unit configured to receive a detection report including information indicating that the slave communication device detects presence of the second power line communication system, from the slave communication device,
    wherein the transmission unit transmits coexistence information indicating coexistence of the first power line communication system and the second power line communication system, based on the detection report, to other communication device which belong to the first power line communication system.

3. The master communication device according to claim 2, wherein the coexistence information including a table which shows whether the master communication device and the slave communication device detect presence of the second power line communication system individually.

4. The master communication device according to claim 1, wherein the first period is repeated by the integral multiple of an AC mains cycle.

5. A slave communication device which belongs to a first power line communication system that is controlled by a master communication device, using a first communication protocol, on a power line on which a second power line communication system using a second communication protocol coexists, wherein the first communication protocol is different from the second communication protocol, the slave communication device comprising:
    a receiving unit configured to receive a first reference signal including first system information indicating a presence of the first power line communication system on the power line, the first reference signal being transmitted from the master communication device periodically and repeatedly, based on an AC cycle of mains on the power line;
    a determination unit configured to determine a first offset indicating a first period which appears periodically and repeatedly, based on the first signal;
    a generation unit configured to generate a second reference signal including the first system information; and
    a transmission unit configured to transmit the second reference signal at the first period,
    wherein the first reference signal is transmitted by the master communication device periodically and repeatedly in accordance with the AC cycle of mains on the power line, and
    the second reference signal is transmitted simultaneously with the first reference signal.

6. The slave communication device according to claim 5, wherein the first period is repeated by the integral multiple of an AC mains cycle.

7. The slave communication device according to claim 5, further comprising:
    a detection unit configured to detect a third reference signal including a second system information indicating presence of the second power line communication system from a communication device which belongs to the second power line communication system and generates a detection report including information indicating that the third reference signal is detected,
    wherein the transmission unit transmits the second reference signal including the detection report to the master communication device.

8. A communication method used in a master communication device that controls a first power line communication system using a first communication protocol on a power line on which a second power line communication system using a second communication protocol coexists, wherein the first communication protocol is different from the second communication protocol, the communication method comprising:
    generating a first reference signal including first system information indicating presence of the first power line communication system on the power line;
    determining a first offset indicating a first period which appears periodically and repeatedly, based on an AC cycle of mains on the power line; and
    transmitting the first reference signal at the first period to a slave device which belongs to the first power line communication system.

9. A communication method used in a slave communication device which belongs to a first power line communication system that is controlled by a master communication device, using a first communication protocol, on a power line on which a second power line communication system using a second communication protocol coexists, wherein the first communication protocol is different from the second communication protocol, the communication method comprising:
    receiving a first reference signal including first system information indicating presence of the first power line communication system on the power line, the first reference signal being transmitted from the master communication device periodically and repeatedly, based on an AC cycle of mains on the power line;
    determining a first offset indicating a first period which appears periodically and repeatedly, based on the first reference signal;

generating a second reference signal including the first system information; and transmitting the second reference signal at the first period, wherein the first reference signal is transmitted by the master communication device periodically and repeatedly in accordance with the AC cycle of mains on the power line, and wherein the second reference signal is simultaneously transmitted according to the transmission timing of the first reference signal.

* * * * *

UNITED STATES PATENT AND TRADEMARK OFFICE
CERTIFICATE OF CORRECTION

PATENT NO. : 8,482,402 B2
APPLICATION NO. : 13/431807
DATED : July 9, 2013
INVENTOR(S) : Stefano Galli et al.

It is certified that error appears in the above-identified patent and that said Letters Patent is hereby corrected as shown below:

On the Title Page

Item (75) Inventors incorrectly reads:

"Stefano Galli, San Jose, CA (US); Akio Kurobe, Osaka (JP); Masato Ohura, Osaka (JP)"

and should read

"Stefano Galli, Morristown, NJ (US); Akio Kurobe, Osaka (JP); Masato Ohura, Osaka (JP)".

Item (56) References Cited, Other Publications, page 2, line 4 incorrectly reads:

"fo QoS support in heterogeneous wired-wireless networks,""

and should read

"for QoS support in heterogeneous wired-wireless networks,"".

Signed and Sealed this
Seventeenth Day of June, 2014

Michelle K. Lee
*Deputy Director of the United States Patent and Trademark Office*